United States Patent
Tada et al.

[11] Patent Number: 6,144,777
[45] Date of Patent: *Nov. 7, 2000

[54] IMAGE FORMING APPARATUS HAVING EDITING FUNCTION

[75] Inventors: Kaoru Tada, Aichi-Ken; Hiroya Sugawa, Toyokawa; Atsushi Ishikawa, Anjo; Akio Nakajima; Hideo Kumashiro, both of Toyokawa, all of Japan

[73] Assignee: Minolta Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/810,240

[22] Filed: Mar. 3, 1997

Related U.S. Application Data

[63] Continuation of application No. 08/149,721, Nov. 9, 1993, abandoned.

[30] Foreign Application Priority Data

Nov. 10, 1992 [JP] Japan ..................... 4-299602
Apr. 22, 1993 [JP] Japan ..................... 5-096278

[51] Int. Cl.⁷ ........................................... H04N 1/387
[52] U.S. Cl. ................... 382/284; 358/450; 358/451; 358/452; 382/296; 382/297
[58] Field of Search ................... 358/448, 450, 358/449, 451, 452, 488, 404, 444; 382/290, 294, 296, 297, 284; 399/45, 363, 370, 382; H04N 1/387

[56] References Cited

U.S. PATENT DOCUMENTS

| | | | |
|---|---|---|---|
| 4,591,884 | 5/1986 | Miyamoto et al. ............... | 346/153.1 |
| 4,642,700 | 2/1987 | Ohta et al. ..................... | 358/488 |
| 5,038,218 | 8/1991 | Matsumoto ...................... | 358/488 |
| 5,051,843 | 9/1991 | Hayashi ......................... | 358/450 |
| 5,105,230 | 4/1992 | Emori ........................... | 355/319 |
| 5,282,065 | 1/1994 | Rackman ........................ | 358/488 |
| 5,331,375 | 7/1994 | Ito . | |
| 5,359,677 | 10/1994 | Katsurada et al. ............... | 382/296 |
| 5,384,645 | 1/1995 | Hasegawa et al. ................ | 382/296 |
| 5,440,403 | 8/1995 | Hashimoto et al. .............. | 358/488 |
| 5,450,213 | 9/1995 | Kobori et al. .................. | 358/450 |
| 5,508,810 | 4/1996 | Sato ............................ | 382/297 |
| 5,649,033 | 7/1997 | Morikawa et al. ............... | 382/297 |
| 5,671,463 | 9/1997 | Morikawa et al. ............... | 399/370 |
| 5,724,490 | 3/1998 | Shibaki et al. ................. | 358/450 |
| 5,839,019 | 11/1998 | Ito ............................. | 399/363 |

FOREIGN PATENT DOCUMENTS

| | | |
|---|---|---|
| 61-66657 | 4/1986 | Japan . |
| 2-50862 | 2/1990 | Japan . |
| 3-79541 | 4/1991 | Japan . |

*Primary Examiner*—Kim Yen Vu
*Attorney, Agent, or Firm*—Sidley & Austin

[57] ABSTRACT

Originals are fed onto a platen glass one by one by an automatic original feeder to be read out by a reading system. The originals are converted into digital image data. The image data is transferred to a memory unit. The memory unit is controlled by a CPU. The memory unit is configured of an image memory, a sentence direction recognizing portion, an RAM producing a management table, an original direction (top and bottom direction) recognizing portion, a rotation processing portion, a sign memory and the like. Based on top and bottom directions of original images and directions in which sentences run included in the images, arrangement of images in a 2in1 or 4in1 mode is determined.

17 Claims, 36 Drawing Sheets

FIG.7

MANAGEMENT TABLE

| REGION | PAGE | ASSOCIATION WITH PREVIOUS REGION | ASSOCIATION WITH SUCCEEDING REGION | VERTICAL LENGTH | HORIZONTAL LENGTH | CHARACTER DIRECTION |
|---|---|---|---|---|---|---|
| 01 | 1 | 00 | 02 | 210 | 297 | NORMAL IMAGE |
| 02 | 1 | 01 | FF | 210 | 297 | NORMAL IMAGE |
| 03 | 2 | 00 | 04 | 210 | 297 | NORMAL IMAGE |
| 04 | 2 | 03 | FF | 210 | 297 | NORMAL IMAGE |
| ------- | | | | | | |

FIG.8

| STEP | PROCESSING |
|---|---|
| 1 | DETECT ORIGINAL SIZE, READ OUT IMAGE |
| 2 | TRANSFER AND WRITE IMAGE DATA TO IMAGE MEMORY |
| 3 | COUNT NUMBER OF BLACK PIXELS FOR EVERY MAIN/SUBSCANNING |
| 4 | DETERMINE LANDSCAPE/PORTRAIT BASED ON DISTRIBUTION OF NUMBER OF BLACK PIXELS FOR EVERY LINE |
| 5 | READ OUT LINE ALONG DIRECTION OF LINE DETERMINED AT STEP 4. DETERMINE HEIGHT OF CHARACTER. |
| 6 | COUNT NUMBER OF BLACK PIXELS IN SENTENCE DIRECTION FOR LINE READ OUT AT STEP 5 |
| 7 | READ OUT CHARACTER BASED ON DISTRIBUTION OF NUMBER OF BLACK PIXELS |
| 8 | DETERMINE MATCHING WITH REFERENCE CHARACTER PATTERN FOR EVERY CHARACTER |
| 9 | CALCULATE AND STORE NUMBER OF CHARACTERS WHICH CAN BE DETERMINED FOR ONE LINE |
| 10 | CARRY OUT STEPS 8, 9 BY ROTATING REFERENCE CHARACTER PATTERN BY 90°, 180°, 270° |
| 11 | COMPARE NUMBER OF CHARACTERS WHICH CAN BE DETERMINED FOR EVERY ROTATION ANGLE OF REFERENCE CHARACTER PATTERN OBTAINED AT STEPS 9, 10 AND DETERMINE THAT ROTATION ANGLE AT WHICH NUMBER OF CHARACTERS WHICH CAN BE DETERMINED IS LARGEST IS DIRECTION OF SENTENCE |
| 12 | DETERMIME DIRECTION OF IMAGE BASED ON INFORMATION OF STEPS 1, 4, 11 |

FIG.9 (P-1)
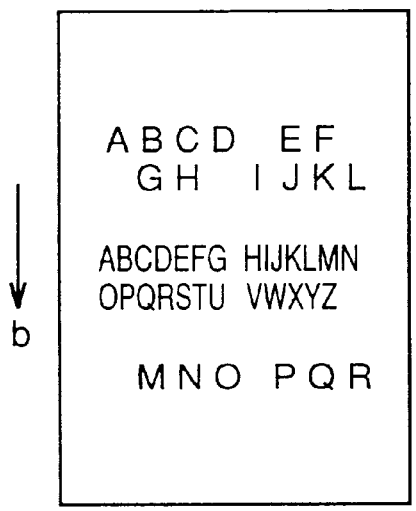
FIG.9 (L-1)
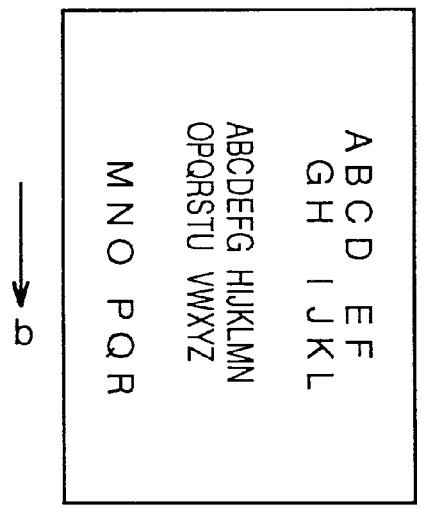
FIG.9 (P-2)
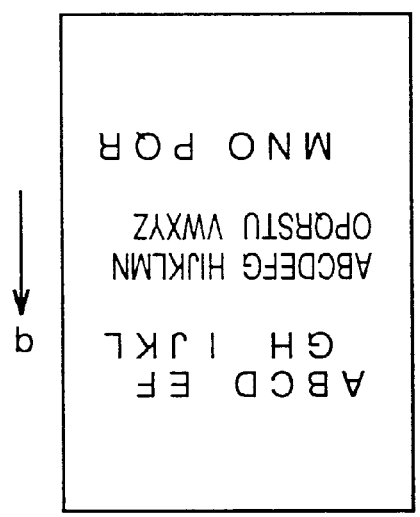
FIG.9 (L-2)
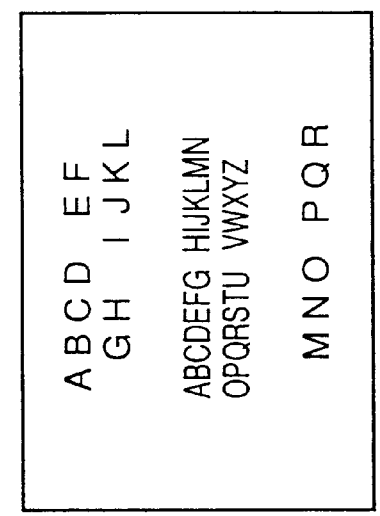

FIG.13 CHARACTER RECOGNITION RATIO FOR RESPECTIVE FONT ROTATION ANGLES

| (STEPS 10, 11, 12) CHARACTER READ OUT | | | | | | A 0° / A 90° / ∀ 180° / ⊢ 270° | | | | ROTATION ANGLE | DETERMINATION RESULT FROM STEP 4 | FINAL RECOGNITION RESULT |
|---|---|---|---|---|---|---|---|---|---|---|---|---|
| P-1 | A | B | C | D | E | F | 5/6 | 1/6 | 1/6 | 1/6 | 0° | PORTRAIT | PORTRAIT NORMAL IMAGE |
| P-2 | R | Q | P | O | N | M | 1/6 | 1/6 | 5/6 | 1/6 | 180° | PORTRAIT | PORTRAIT REVERSED (180°) IMAGE |
| L-1 | A | B | C | D | E | F | 1/6 | 5/6 | 1/6 | 1/6 | 90° | LANDSCAPE | LANDSCAPE NORMAL IMAGE |
| L-2 | R | Q | P | O | N | M | 1/6 | 1/6 | 1/6 | 5/6 | 270° | LANDSCAPE | LANDSCAPE REVERSED (180°) IMAGE |
| (ERRONEOUS RECOGNITION RATIO=20%) | | | | | | | | | | | | | |

FIG.14a
PAGE 2　PAGE 1

|かきくけこ|あいうえお|

PORTRAIT

FIG.14b
PAGE 1　PAGE 2

| A B C D | a b c d |
| ..... | ..... |
| ..... | ..... |

PORTRAIT

FIG.14c
PAGE 1

| あいうえお |
| かきくけこ |

PAGE 2

LANDSCAPE

FIG.14d
PAGE 1

| A B C D |
| ..... |

PAGE 2

| a b c d |
| ..... |

LANDSCAPE

FIG.14e
PAGE 3　　　　　　　PAGE 1
PAGE 4　　　　　　　PAGE 2

| さしすせそ | あいうえお |
| たちつてと | かきくけこ |

PORTRAIT

FIG.14f
PAGE 1　　　　　　　PAGE 2
PAGE 3　　　　　　　PAGE 4

| A B ·· | C D ·· |
| ···· | ···· |
| E F ·· | G H ·· |
| ···· | ···· |

PORTRAIT

FIG.14g
PAGE 3　　　　　　　PAGE 1
PAGE 4　　　　　　　PAGE 2

| さしす | あいう |
| たちつ | かきく |

LANDSCAPE

FIG.14h
PAGE 1　　　　　　　PAGE 2
PAGE 3　　　　　　　PAGE 4

| A B C D | E F G H |
| ···· | ···· |
| I J K L | M N O P |
| ···· | ···· |

LANDSCAPE

FIG.35A
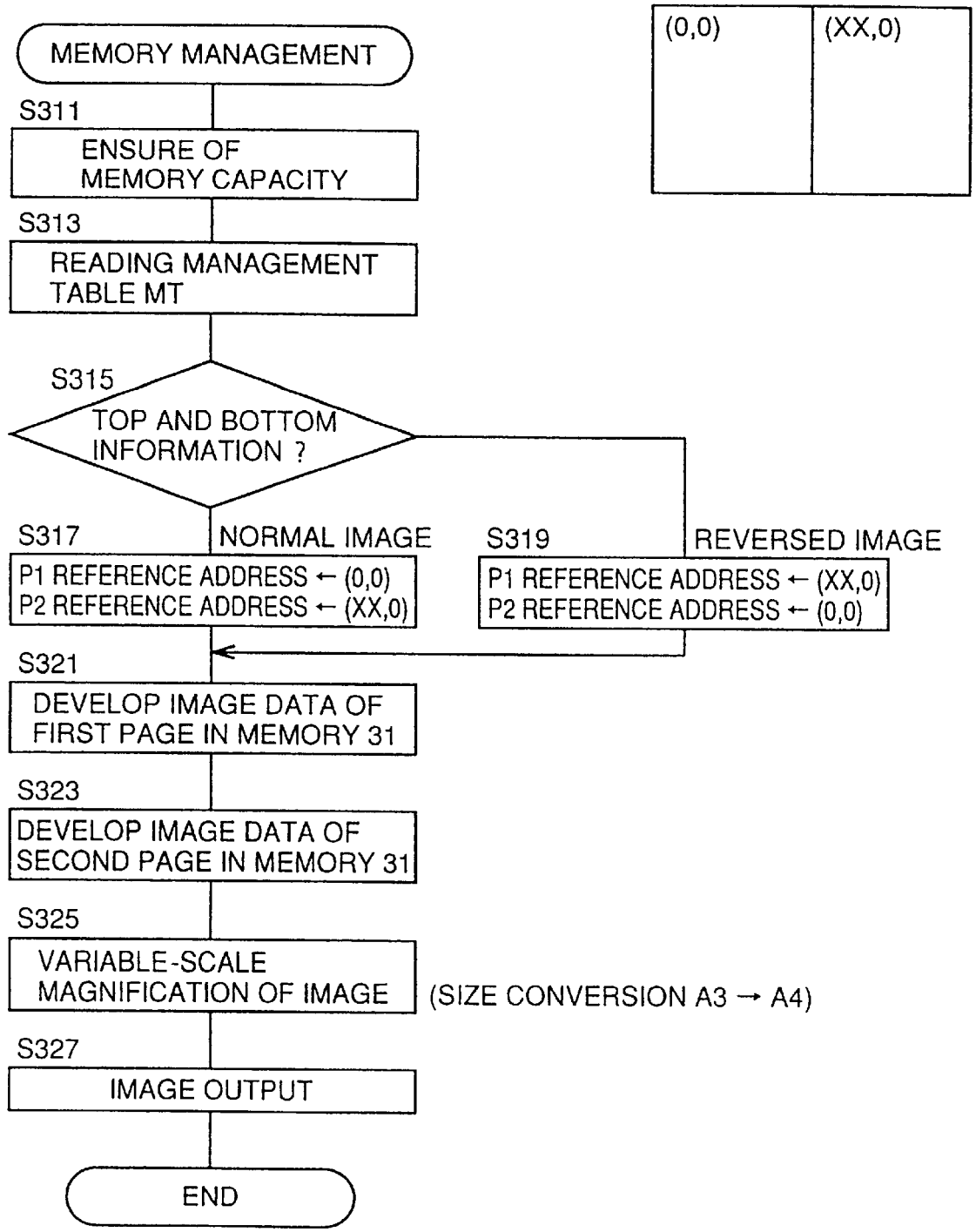
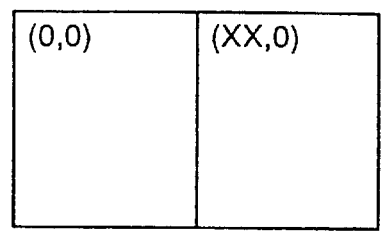
FIG.35B

IMAGE FORMING APPARATUS HAVING EDITING FUNCTION

CROSS REFERENCE TO RELATED APPLICATIONS

This is a continuation of U.S. patent application Ser. No. 08/149,721 filed Nov. 9, 1993, now abandoned.

BACKGROUND OF THE INVENTION

1. Field of the Invention

The present invention generally relates to image forming apparatuses, and more particularly, to an image forming apparatus of an electrophotographic system having an image editing function editing data of a read original image.

2. Description of the Related Art

An electrophotography copying apparatus is provided carrying out processings in an Nin1 mode in which a plurality of original images are copied on a papersheet. In this mode, it is necessary to set a plurality of original images with their top and bottom directions and directions in which sentences run matched on a papersheet. A so-called 2in1 mode is conventionally known. In the 2in1 mode, using an automatic original feeder (ADF) of an analog copying apparatus, two originals placed on a platen glass are fed and stopped, and images of the two originals are simultaneously exposed to be copied on a papersheet. In the 2in1 mode, irrespective of top and bottom directions and directions in which sentences run of originals, the original are copied according to the order of the originals set on an original tray of the ADF.

Therefore, the operator must set originals on the original tray after confirmation of top and bottom directions and directions in which sentences run of the originals.

On the other hand, recently, various digital copying apparatuses have been developed. The digital copying apparatus optically reads out an original image to generate image data. The digital apparatus applies various corrections and processings to the image data to provide the same as printing data. The digital copying apparatus emits the printing data from an image printing head as light beams to form an image on a photoreceptor. In the digital copying apparatus of this kind, editing such as rearrangement and rotation of digitalized image data can be carried out. The digital copying apparatus can carry out processing not only in the 2in1 mode but also in a 4in1 mode.

However, currently the digital copying apparatus does not include an image forming apparatus having a function of automatically rearranging a plurality of read original images so that they can be printed on one papersheet with their directions uniform.

SUMMARY OF THE INVENTION

One object of the present invention is to form a plurality of read original images on a papersheet in a predetermined direction in an image forming apparatus.

Another object of the present invention is to form a plurality of images on a papersheet in a predetermined order in an image forming apparatus without requiring the user to take care of top and bottom directions of originals.

According to one aspect of the present invention, in the image forming apparatus, a direction of an image is detected based on image data stored in a memory, and a plurality of images are formed on a papersheet in a predetermined arrangement based on the detection result. As a result, in the image forming apparatus, a plurality of original images are formed on a papersheet in a predetermined direction.

According to another aspect of the present invention, in the image forming apparatus, top and bottom directions are determined for a plurality of original images. According to the determination result, the plurality of original images are formed on a papersheet in a manner that images having right top and bottom directions are arranged in a prescribed order, and images having opposite directions are arranged in a different order from the prescribed order. As a result, in the image forming apparatus, the plurality of original images are formed on a papersheet in a predetermined page order without requiring the user to take care of top and bottom directions of the originals.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a chart showing a management table.

FIG. 8 is a chart showing an algorithm for determining kinds of original images.

FIGS. 9(P-1), 9(P-2), 9(L-1), 9(L-2) are diagram for explaining kinds and directions of the original images.

FIG. 13 is a diagram for explaining recognition of top and bottom directions of the originals.

FIG. 14(a–h) are diagrams for explaining arrangement of original images in the Nin1 mode.

FIGS. 35A, 35B are flow charts showing the specific operation of the copying apparatus according to a second embodiment of the present invention.

DESCRIPTION OF THE PREFERRED EMBODIMENTS (1) The First Embodiment

Figure 1:
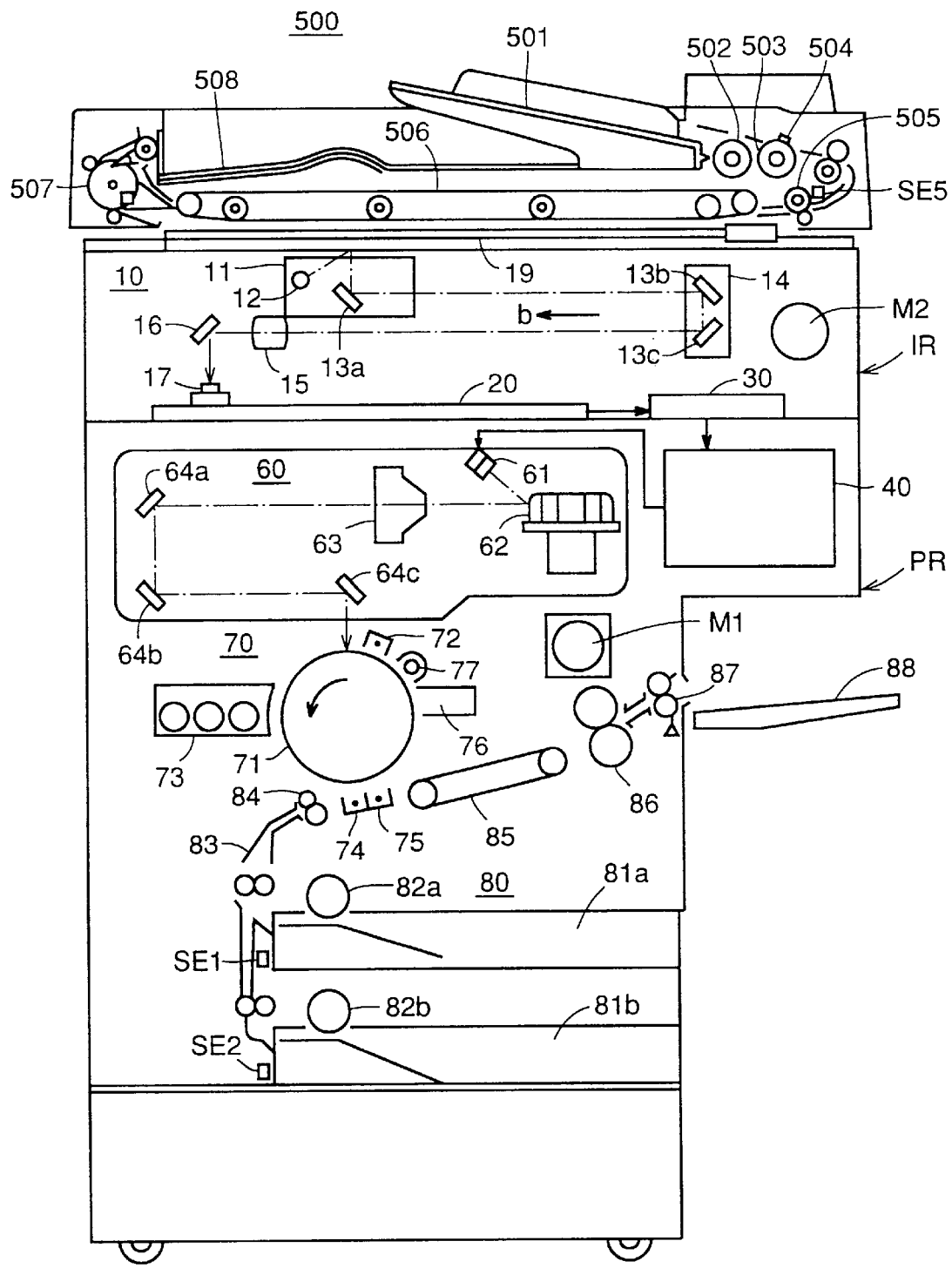
FIG. 1 is an internal structure diagram of a digital copying apparatus to which the present invention is applied.

Embodiments of the image forming apparatus according to the present invention will now be described with reference to the attached drawings. Referring to FIG. 1, the digital copying apparatus to which the present invention is applied reads out by a reading system 10 images of originals fed one by one onto a platen glass 19 by an automatic original feeder 500 (hereinafter referred to as an "ADF"). The image forming apparatus drives a laser beam scanning optical system 60 based on the read image data to form an electrostatic latent image on a photoreceptor drum 71, and develops the latent image to transfer the image on a papersheet. In the digital copying apparatus, as will be described later, it is possible to carry out the processing both in a 2in1 mode in which two original images are transferred onto one papersheet by one image forming processing and a 4in1 mode in which four original images are transferred onto one papersheet by one image forming processing (both of which will generally be referred to as an "Nin1 mode").

More specifically, the digital copying apparatus to which the present invention is applied includes reading system 10 reading out an original image to convert the same into image data, an image data processing unit 20 processing the image data transmitted from reading system 10, a memory unit 30 carrying out switching between outputting the image data transmitted from image data processing unit 20 directly to a printer PR as printing data and once storing the image data in a memory or the like, a printing processing unit 40 driving an optical system 60 based on the printing data transmitted from memory unit 30, optical system 60 scanning laser beams emitted from a semiconductor laser 61 on a photoreceptor drum 71, an image forming system 70 developing and transferring a latent image formed on photoreceptor drum 71, a sheet feeding system 80, and ADF 500 including a function of feeding an original and inverting two sides of the original if it has images on both sides. A reader IR is configured by A reading system 10, image data processing unit 20, and memory unit 30, and the printer PR is configured by A printing processing unit 40, optical system 60, image forming system 70 and sheet feeding system 80.

Reading system 10 includes an exposure lamp 12 and a first mirror 13a attached to a first scanner 11, second mirrors 13b, 13c attached to a second scanner 14, an imaging lens 15, a fourth mirror 16, a line sensor 17 of a CCD (Charge Coupled Device), and a motor M2. Scanners 11, 14 are driven by motor M2 to move in the direction of an arrow b (subscanning direction) directly under platen glass 19. With the movement, an image of an original set on platen glass 19 is read out by line sensor 17. Line sensor 17 includes a plurality of devices (CCD) arranged in a direction orthogonal to the subscanning direction b. This direction is referred to as a main scanning direction.

Description will be given below image data processing unit 20 and memory unit 30.

Printing processing unit 40 drives optical system 60 line by line in the main scanning direction based on the printing data.

Optical system 60 includes semiconductor laser 61 modulation (on, off) controlled by printing processing unit 40, a polygon mirror 62 polarizing and scanning laser beams emitted from semiconductor laser 61, an fθ lens 63 correcting distortion aberration or the like of the polarized laser beams, and mirrors 64a, 64b, 64c leading the laser beams onto photoreceptor drum 71.

Image forming system 70 includes a corona charger 72, a developing device 73, a transfer charger 741 a copy paper separation charger 75, a cleaner 76 of remaining toner, and an eraser lamp 77 of remaining electric charges disposed along the direction of rotation around photoreceptor 71 rotated and driven in a direction of an arrow c. Since the image forming process of image forming system 70 is known, the description will be omitted.

Sheet feeding system 80 includes automatic paper feed cassettes 81a, 81b in which copy papersheets are housed in stack, paper feeding rollers 82a, 82b feeding the papersheets one by one, a sheet feed path 83, a timing roller 84, a transport belt 85, a toner fixing device 86, a discharge roller 87, and a discharge tray 88. Sheet feeding system 80 and photoreceptor drum 71 are driven by a main motor M1. Sheet size detecting sensors SEI1, SE2 are provided in the vicinity of cassettes 81a, 81b, and a sheet detecting sensor is provided at a prescribed position of the sheet feeding path.

ADF 500 includes an original mount tray 501, a pickup roller 502, a sort roller 503 and sort pad 504, a register roller 505, a transport belt 506, a reversing roller 507, and discharge tray 508. Originals mounted on tray 501 are fed/stopped to and on platen glass 19 one by one from the lowermost one, and have the images read out by reading system 10. After being read out, the originals are discharged onto discharge tray 508 via reversing roller 507. In the case of an original having images on both sides, the original is returned onto platen glass 19 after one rotation around reversing roller 507. Therefore, transport belt 506 can be rotated normally and reversed. The size of the original is detected by a sensor SE5 immediately before the original is sent to platen glass 19.

In the normal mode, the copying apparatus structured as described above reads out an image of one original, generates printing data after applying necessary corrections to the image data, provides the printing data by optical system 60, and forms the image on one copy papersheet. In addition, the copying apparatus can select the Nin1 mode (2in1 mode and 4in1 mode) to carry out the processing. In the Nin1 mode, the copying apparatus reads out two or four original images, recognizes their top and bottom directions and directions in which sentences run by memory unit 30, and arranges respective original images so that their top and bottom directions and directions in which sentences run match.

In the case of the 2in1 mode, after reduction of respective original images into ½, the images are arranged as shown in FIGS. 14a, 14b if they are portraits, and as shown in FIGS. 14c, 14d if landscapes. In the case of the 4in1 mode, after reduction of respective original images into ¼, the images are arranged as shown in FIGS. 14e, 14f if they are portraits, and as shown in FIGS. 14g, 14h if landscapes.

Figure 2:
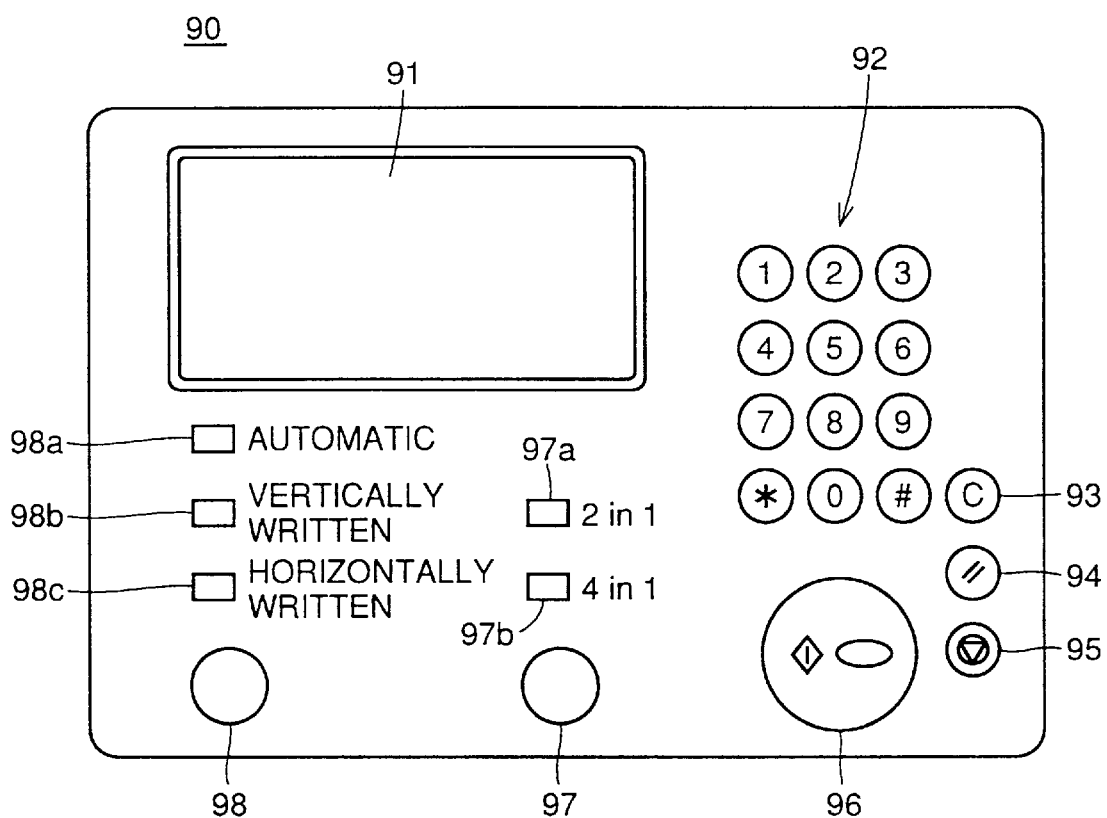
FIG. 2 is a plan view of an operation panel.

FIG. 2 shows an operation panel 90 of the copying apparatus, on which operation keys and displays described hereinafter are provided: 91: a liquid crystal display, 92: a ten key, 93: a clear key, 94: an interruption key, 95: a reset key, 96: a copy start key, 97: an Nin1 mode selection key, 97a: a 2in1 mode selection display LED, 97b: a 4in1 mode selection display LED, 98: a sentence direction selection key, 98a: automatic recognition selection display LED, 98b: a vertical writing selection LED, and 98c: a horizontal writing selection LED.

The copy mode is set to the normal mode in an initialized state in which the copying apparatus is powered on. LEDs 97a, 97b are turned off. If Nin1 mode selection key 97 is turned on, LED 97a is turned on, and the 2in1 mode is selected. If key 97 is again turned on, LED 97a is turned off, LED 97b is turned on, and the 4in1 mode is selected. If key 97 is again turned on, LED 97a is turned off, and the copy mode returns to the normal mode.

When any of the 2in1 mode or 4in1 mode is selected, LED 98a is turned on, and a sentence direction automatic recognition mode is selected. At this time, as will be described in detail later, top and bottom directions of images and directions in which sentences run are automatically recognized in memory unit 30, and the imagesare arranged based on the recognition result (cf. FIGS. 14a–14h). On the other hand, if sentence direction selection key 98 is turned on, LED 98a is turned off and LED 98b is turned on. It is inputted that the original to be copied is a vertically written original. If key 98 is again turned on, LED 98b is turned off and LED 98c is turned on. It is inputted that the original to be copied is a horizontally written original. If key 98 is again turned on, LED 98c is turned off and LED 98a turned on. The copy mode returns to the automatic recognition mode.

Operation panel 90 includes keys and displays other than keys 97, 98 and LEDs 97a, 97b, 98a, 98b, 98c. However, those keys and displays will be neither shown nor described.

Description will now be given of the control portion of the copying apparatus.

Figure 3:
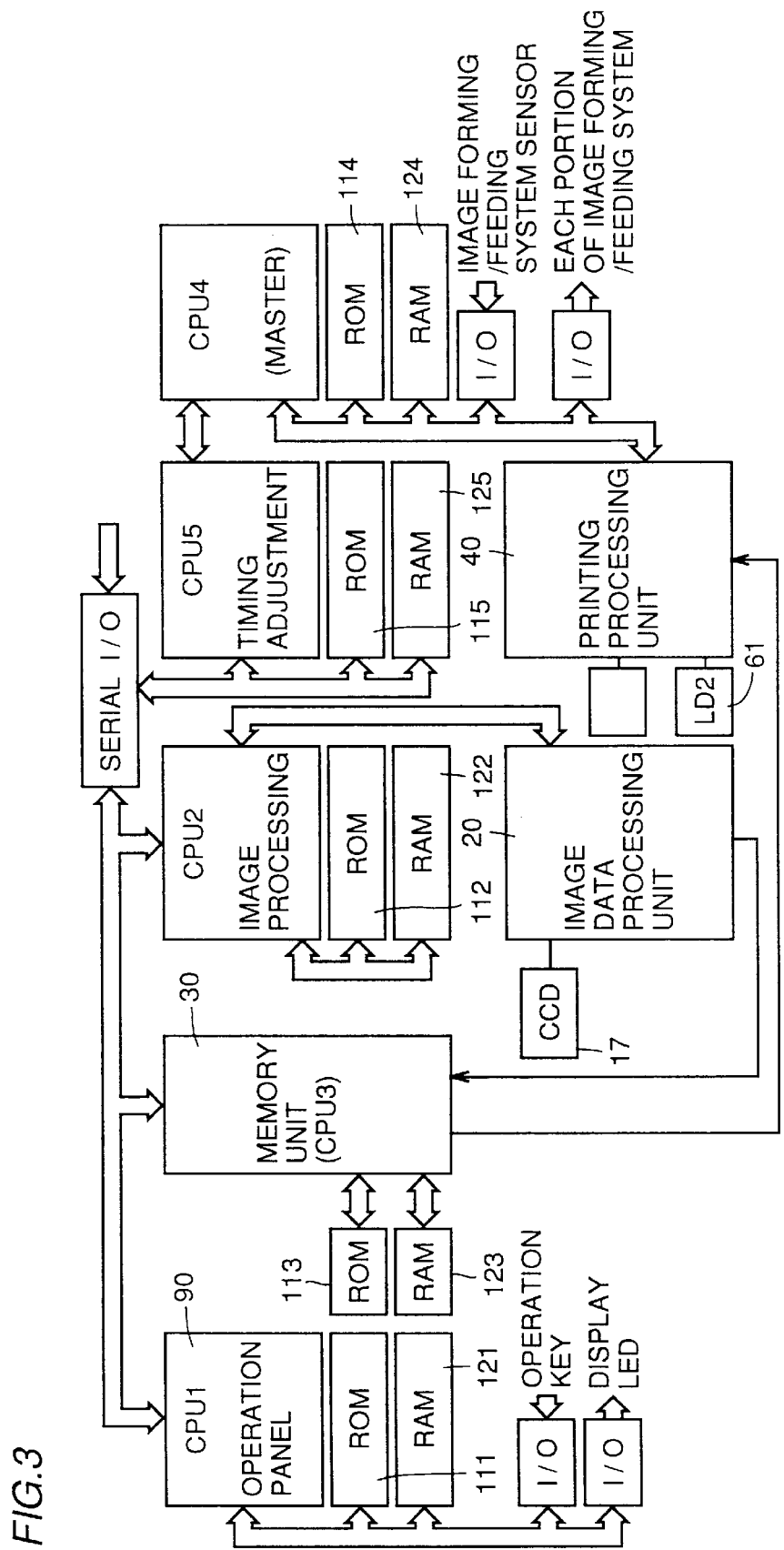
FIGS. 3 and 4 are block diagrams showing the entire configuration of a copying apparatus control portion.
Figure 4:
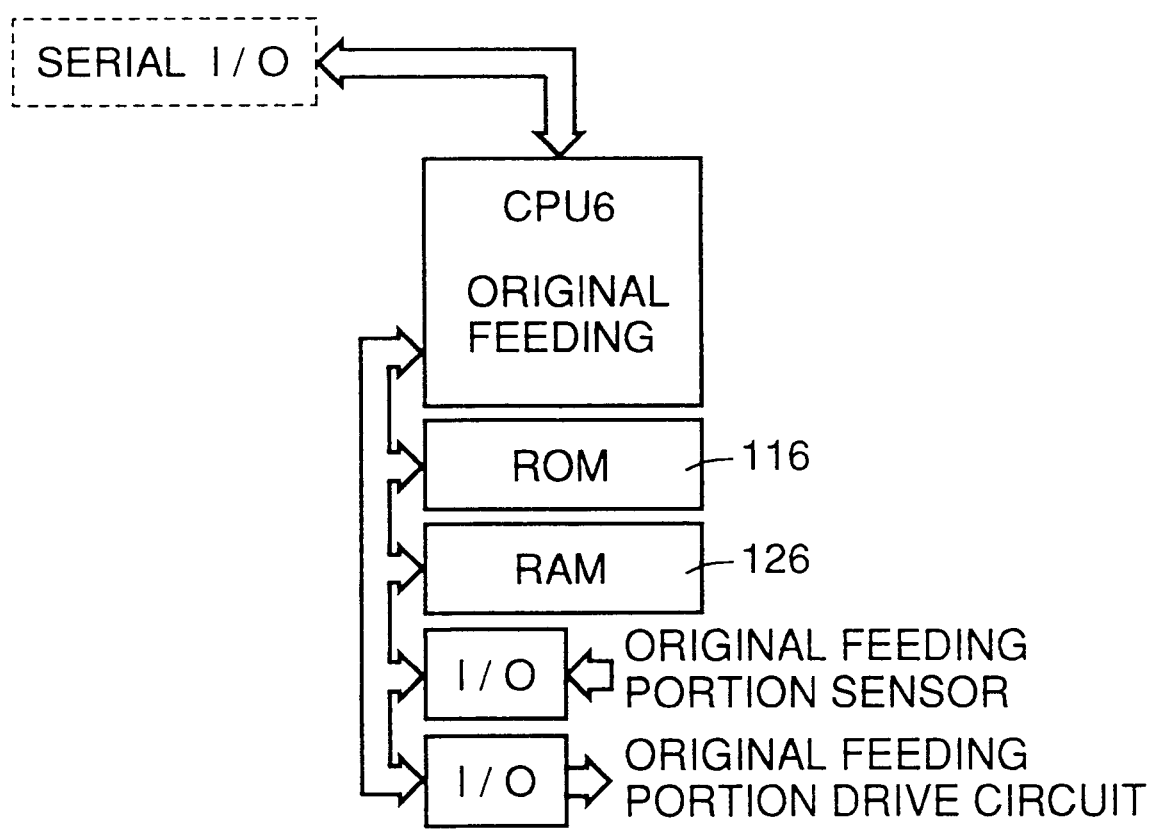

FIGS. 3 and 4 show the entire configuration of the control portion. The control portion is mainly configured of six CPUs 1 to 6. CPUs 1 to 6 include ROMs 111 to 116 in which necessary programs are stored, and RAMs 121 to 126 serving as working areas of program execution, respectively.

CPU 1 carries out control relating to input and display of signals from various operation keys of operation panel 90. CPU 2 carries out control of each portion of image data processing unit 20 and drive and control of reading system 10. By controlling memory unit 30, CPU 3 applies necessary processings to the image data transferred from image data processing unit 20 to provide the same as printing data, and transfers the printing data to printing processing unit 40.

CPU 4 carries out control of printing processing unit 40, optical system 60, image forming system 70, and sheet feeding system 80. Detect signals from sheet size detecting sensors SE1, SE2 are inputted to CPU 4 through an I/O.

CPU 5 carries out control for total timing adjustment and operation mode setting of the control portion. CPU 6 carries out control of ADF 500. CPU 6 is connected to CPUs 1, 2, 3 and 5 through a serial I/O. Feed, transport, discharge or the like of originals is instructed by CPU 5. A detect signal from original size detecting sensor SE5 is applied to CPU 6 through the serial I/O to be further transferred to CPU 5. Based on the information, CPU 5 produces an original management table MT (cf. FIG. 7), which will be described hereinafter.

Figure 5:
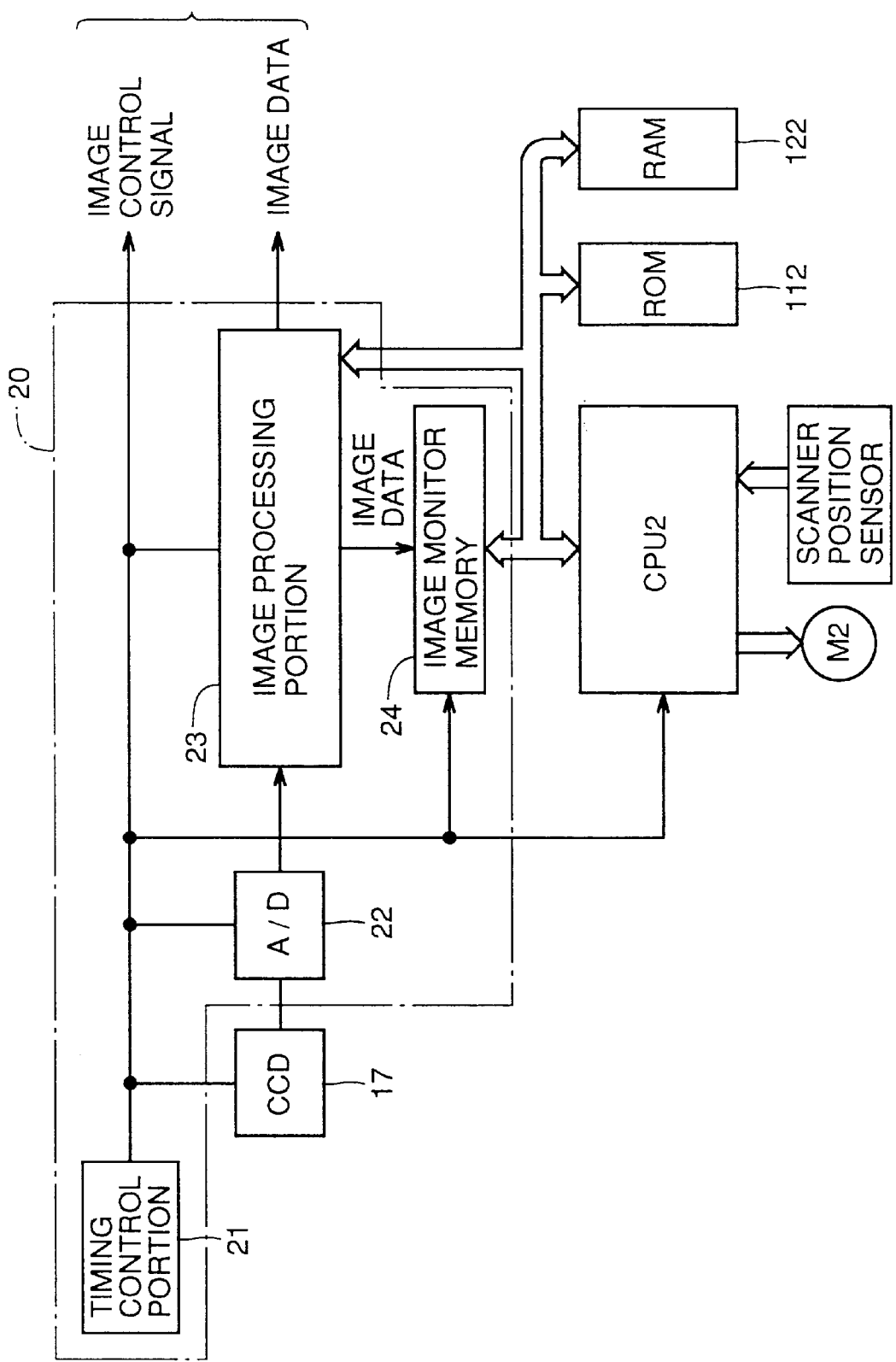
FIG. 5 is a block diagram showing an image data processing unit.

Description will now be given of image data processing unit 20 with reference to FIG. 5.

Image data processing unit 20 includes a timing control portion 21, an A/D (Analog/Digital) converter 22, an image processing portion 23, and an image monitor memory 24. An image reading synchronization signal is supplied to each portion of line sensor 17, CPU 2, and image data processing unit 20 from timing control portion 21. Reading system 10 is driven by CPU 2, and the original image is read out by line sensor 17. The analog signal read out by line sensor 17 is converted into digital image data by A/D converter 22 to be sent to image processing portion 23. In image processing portion 23, image quality correction such as shading correction, MTF (Modulation Transfer Function) correction, gamma correction and well-known image processing such as variable-scale magnification, image editing are carried out. Image monitor memory 24 stores image data for one line in response to instruction from CPU 2. The image data after correction is transferred to memory unit 30.

Figure 6:
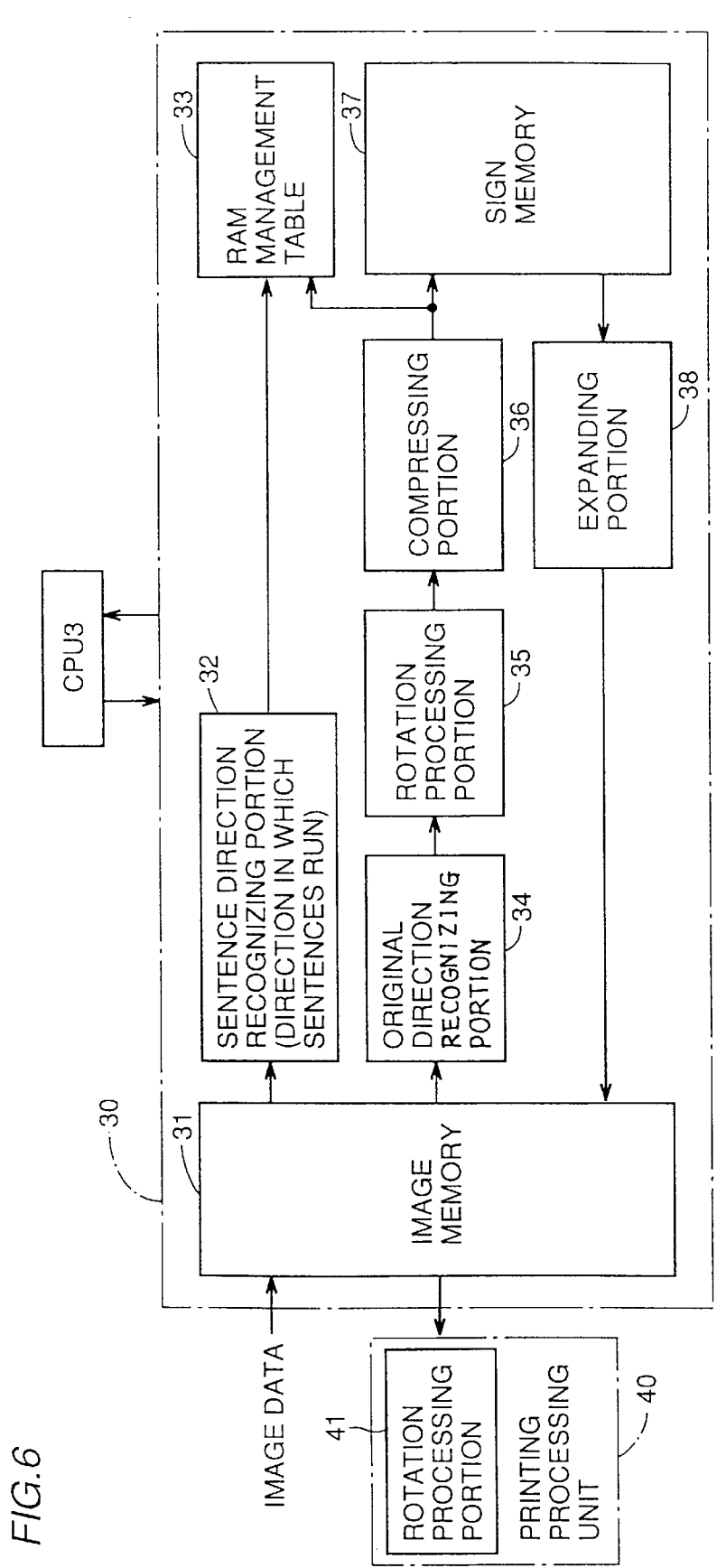
FIG. 6 is a block diagram showing a memory unit.

Description will now be given of memory unit 30 with reference to FIG. 6.

Memory unit 30, controlled by CPU 3, includes an image memory 31, a sentence direction recognizing portion 32, a RAM 33 producing the management table MT, an original direction recognizing portion 34, a rotation processing portion 35, a compressing portion 36, a sign memory 37, and an expanding portion 38. The image data for one page transferred from image data processing unit 20 is first written in image memory 31. CPU 3 reads out the image data, and identifies a character region in the image. As for the identified character region, the direction of the character is recognized in each direction of 0°, 90°, 180°, and 270° by sentence direction recognizing portion 32 and original direction recognizing portion 34. Based on the recognition result, it is determined whether the sentence in the image is vertically written or horizontally written. The top and bottom direction of the image is also determined. As a result, it is recognized whether the image is a portrait (vertically written image, cf. FIG. 9 (P-1), FIG. 9 (P-2)) or a landscape (horizontally written image, cf. FIG. 9 (L-1), FIG. 9 (L-2)). The information on the direction in which sentences run is sent to RAM 33, and the management table MT described below is prepared. The image data is rotated so as to match-a predetermined direction by rotation processing portion 35, compressed by compressing portion 36, and written in sign memory 37.

The image data written in sign memory 37 is read out in response to instruction of CPU 3. After being expanded by expanding portion 38, the image data is written in image memory 31. When the processing is carried out in the Nin1 mode, two or four image data are written in a position instructed by CPU 3 in image memory 31 with directions in which sentences run and top and bottom directions of the originals matched. The image data is composed as printing data for one page. FIGS. 14a to 14h can be understood as printing data for one page thus composed.

The printing data written in image memory 31 is transferred to printing processing unit 40 to be printed on photoreceptor drum 71 by driving optical system 60. A rotation processing portion 41 is included in printing processing unit 40 to rotate the printing data as needed.

It should be noted that sign memory 37 is managed by the management table MT stored in RAM 33. Sign memory 37 is divided into memory regions of 32K byte unit. Taking into consideration simultaneous control of writing and reading, image data for each page is stored in each region. As shown in FIG. 7, the management table MT stores information of such as the page number, the number of association with the previous region, the number of association with the following region, vertical length, lateral length, character direction, compression system of each region for memory regions 00, 01, 02, 03, . . . of 36K byte unit. "00" of the number of association with the previous region indicates the first region, and "FF" of the number of association with the following region indicates the last region. Based on the stored information, sign memory 37 is managed. When CPU 3 reads out and compresses the image data from image memory 31, CPU 3 prepares information of the management table MT, controls compressing portion 36, and writes the image data in sign memory 37. When CPU 3 reads out the image data from sign memory 37, CPU 3 carries out control opposite to the control carried out in writing. In the management table MT, information for one page is erased once the information is read from sign memory 37 for a necessary number of copies.

Directions of top and bottom and directions in which sentences run of images with determination thereof will be described.

FIG. 8 shows these determination algorithms for each processing step. Step 1 and step 2 have already been described.

FIGS. 9 (P-1), (P-2), (L-1), (L-2) show directions of images based on the kind of images and the mounting state of originals to tray 501 when images of A4 sized vertical originals (in which the elongate direction of the original and the reading direction b of the original image are parallel) are read out. FIG. 9 (P-1) shows a portrait having an image directed upward, and FIG. 9 (P-2) shows a portrait having an image directed downward. FIG. 9 (L-1) shows a landscape having an image directed upward, and FIG. A (L-2) shows a landscape having an image directed downward.

Figure 10:
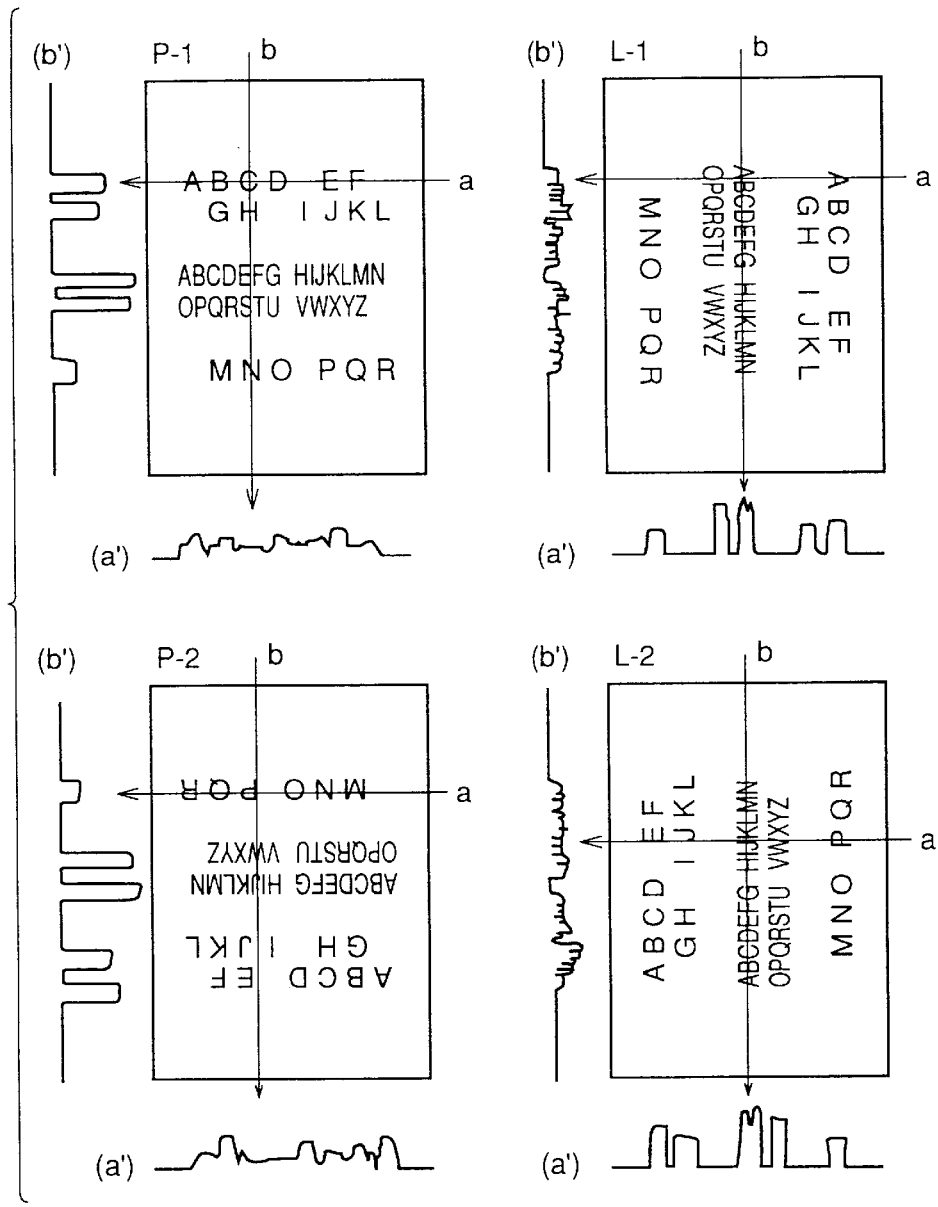
FIGS. 10 and 11 are diagrams for explaining determination of kinds of the original images.

As for each image data shown in FIGS. 9(P-1), (P-2), (L-1), and (L-2), the image data is read out from image memory 31 in the main scanning direction a and the sub-scanning direction b. It is determined whether the image data is black or white for each pixel to count the number of black pixels for each line. The processing corresponds to step 3 of FIG. 8. The processing is shown schematically in FIG. 10. Based on the counting result, distribution of the number of black pixels for each line is checked in step 4, to determine whether the image is a landscape or a portrait. In FIG. 10, (a') shows the distribution state in line a in the main scanning direction, and (b') shows the distribution state in line b in the subscanning direction.

Figure 11:
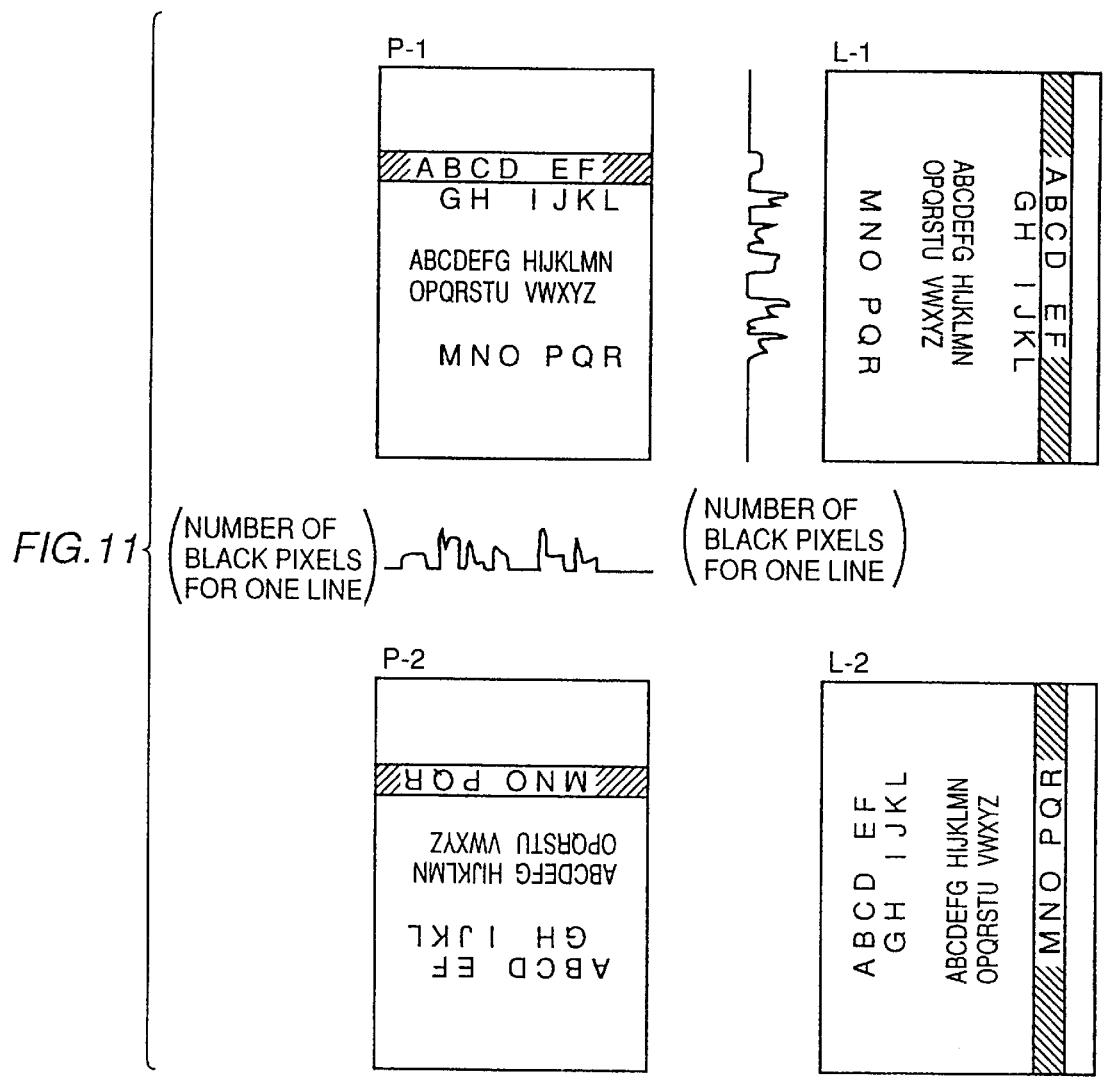

FIG. 11 shows reading out of a line in steps 5, 6 and counting of the number of black pixels in the sentence direction.

Figure 12:
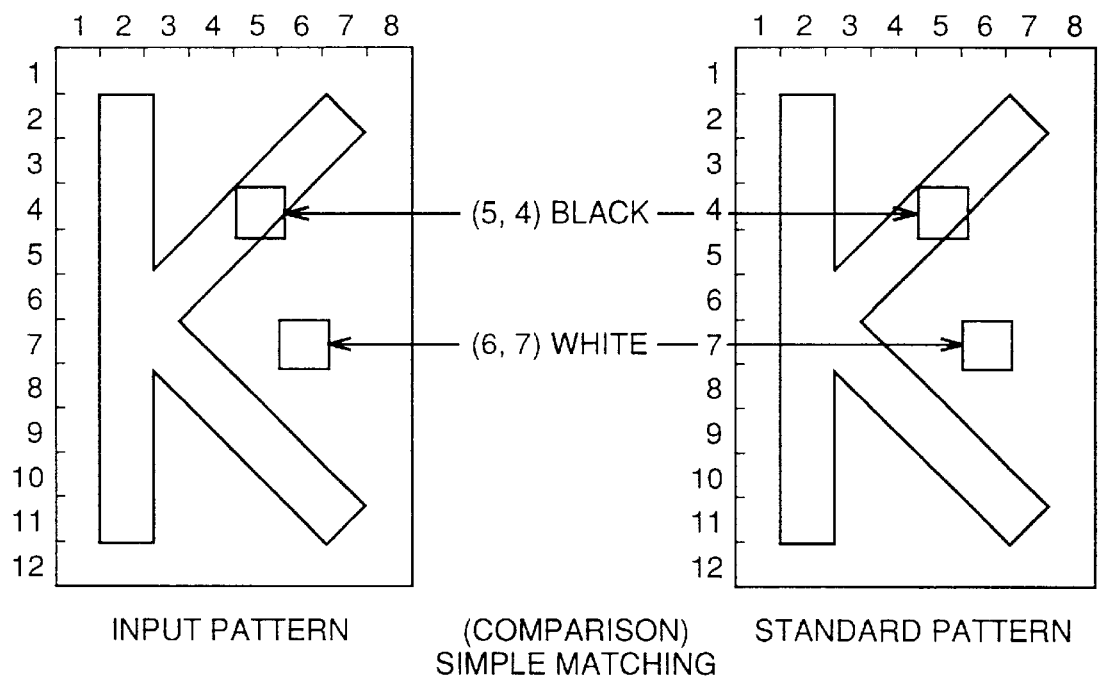
FIG. 12 is a diagram for explaining character recognition in the original images.

FIG. 12 shows a method of character recognition by pattern matching in step 8. A standard pattern is prepared in advance for every character to be read. An inputted unknown character pattern is interposed onto the standard pattern. Comparison of white and black is made for each pixel. It is determined that a character of a standard pattern having all pixels matched is a character of the inputted pattern. When there is no standard pattern having all pixels matched, the character of the inputted pattern is determined to be a character of a standard pattern having the most pixels matched. The character of the inputted pattern cannot be determined if a prescribed matching ratio is not reached.

FIG. 13 shows a specific example in which the direction of an image is determined based on the result of the above-described character recognition in steps 9 to 12. The direction of the image is determined from pattern recognition for each read out character and the rotation angle.

FIGS. 15 to 28 are schematic diagrams showing the processing state of the image data in the Nin1 mode in each portion of the control portion. The arrow given to each image shows the main scanning direction.

Figure 15:
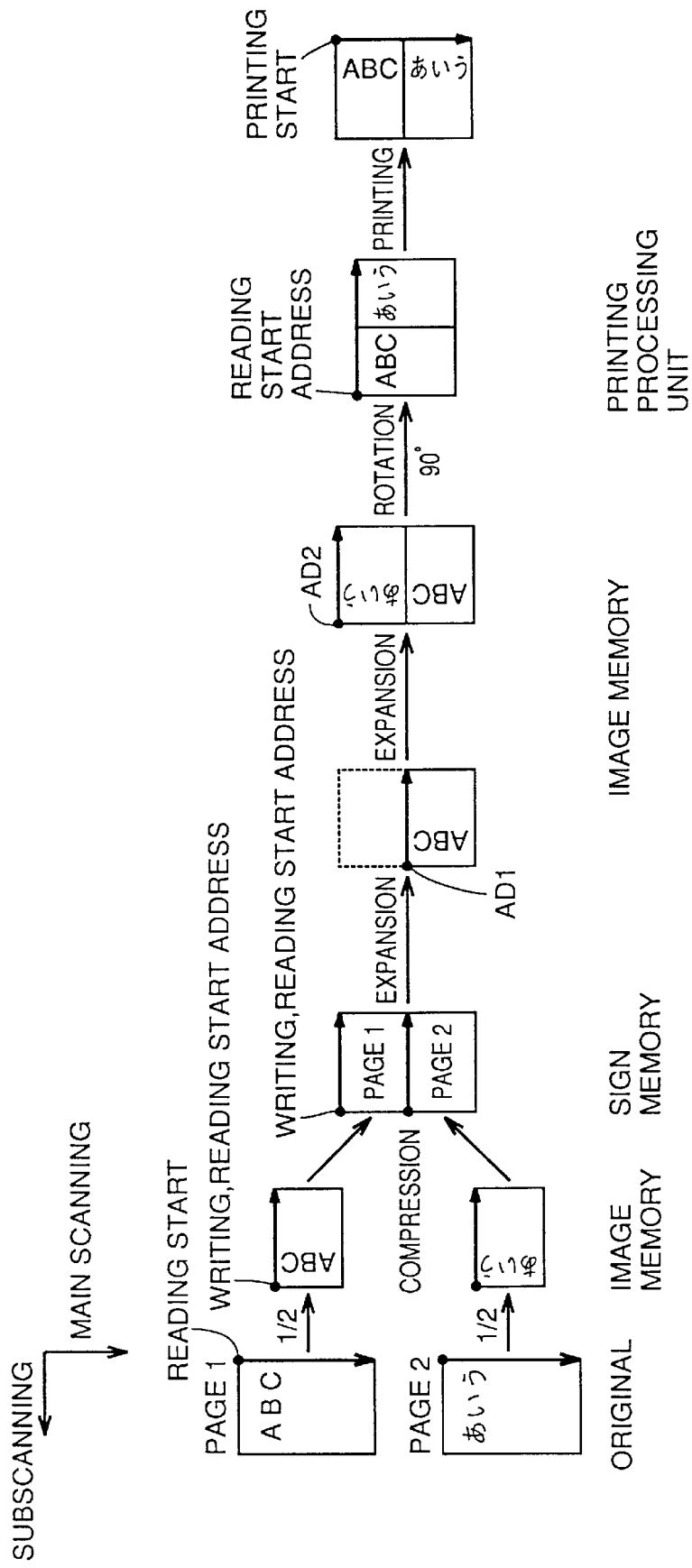
FIGS. 15 and 16 are diagrams explaining the image data processing of portrait horizontally written originals in the 2in1 mode.

FIG. 15 shows the case where a portrait horizontally written original is fed horizontally by ADF500 in the 2in1 mode. The original image is reduced to ½ to be read out by reading system 10. The image data is written in image memory 31 via image data processing unit 20. In the image memory, the above-described sentence direction and image direction are recognized. Image data of pages 1 and 2 are compressed to be written in sign memory 37. If the original of page 2 is fed to platen glass 19 by ADF 500 with top and bottom reversed, the image data of page 2 is rotated by 180° in rotation processing portion 35 to be written in sign memory 37.

Then, the image data of page 2 is read out from an address AD1. The image data is expanded to be written in image memory 31. After that, the image data of page 1 is read out from an address AD2. The image data of page 1 is expanded to be written in image memory 31. All printing data for one page is thus prepared. The printing data is transferred to printing processing unit 40. In order to match the image direction and the feeding direction of a transfer sheet in printing processing unit 40, the image is rotated by 90° in rotation processing portion 41. If a vertical sized transfer sheet is selected, it is not necessary to rotate the image here.

Figure 16:
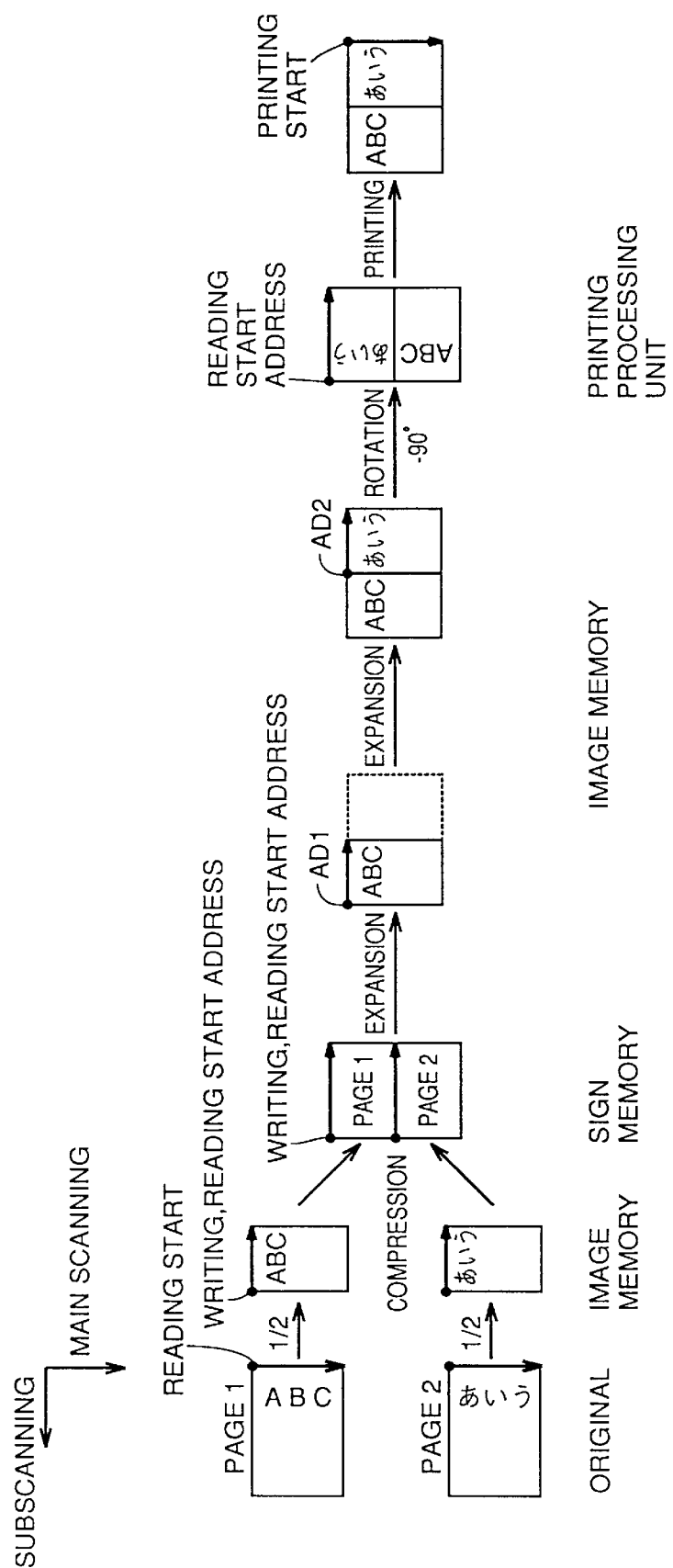

FIG. 16 shows the case where the portrait horizontally written original is fed vertically by ADF 500 in the 2in1 mode. In order to match the image with the feeding direction of the transfer sheet, the printing data transferred from image memory 31 to printing processing unit 40 is rotated by −90°.

Figure 17:
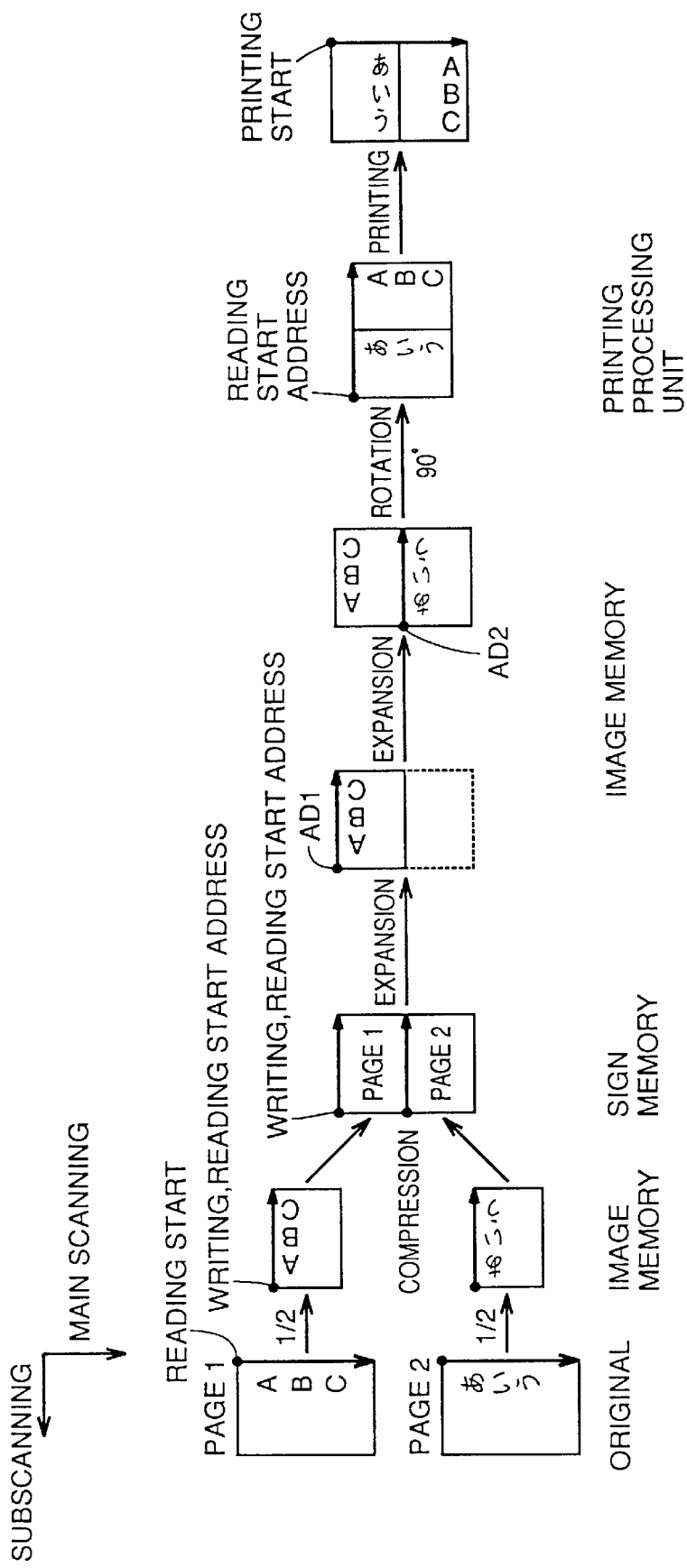
FIGS. 17 and 18 are diagrams explaining the image data processing of portrait vertically written originals in the 2in1 mode.
Figure 18:
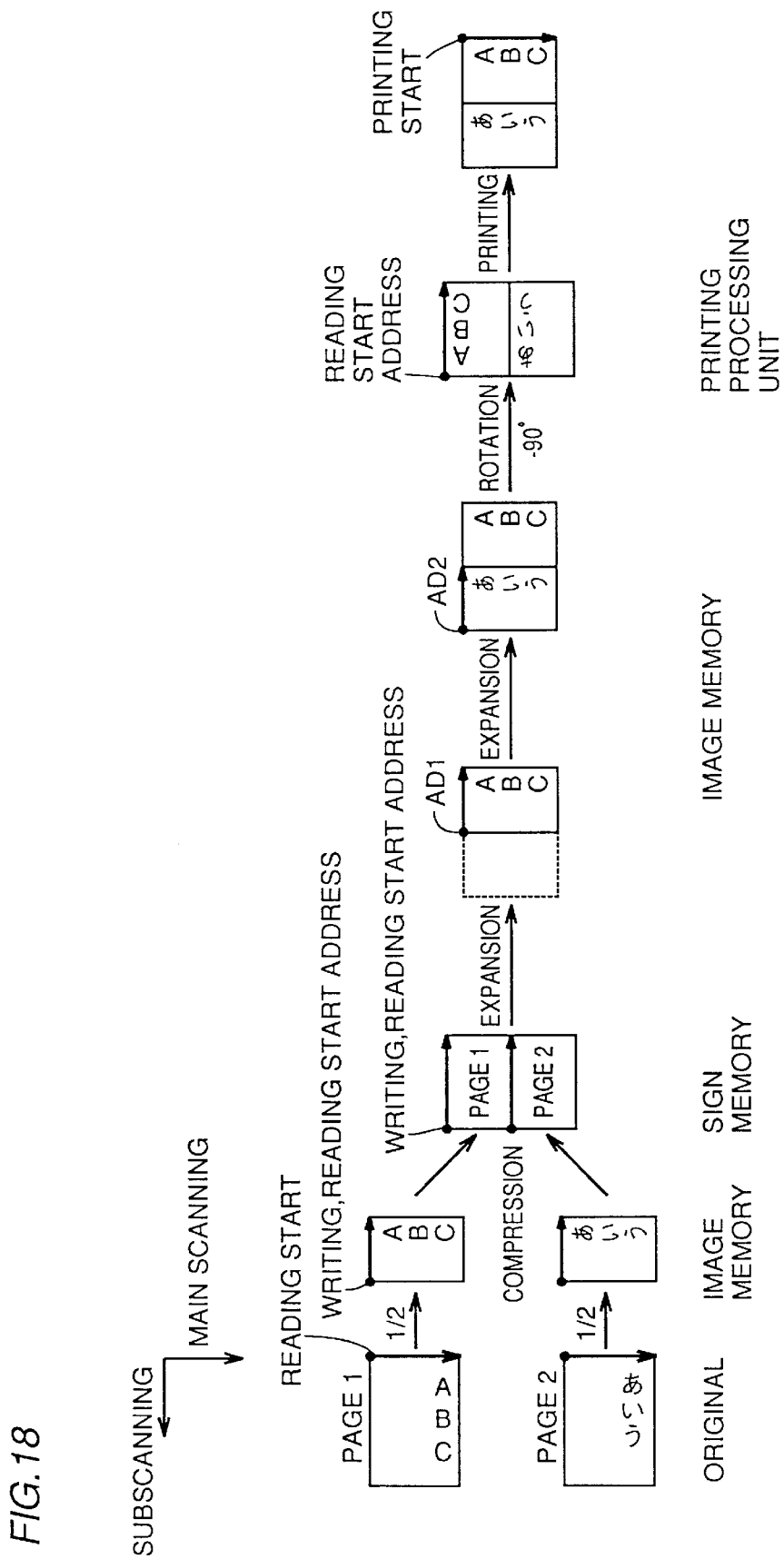
Figure 19:
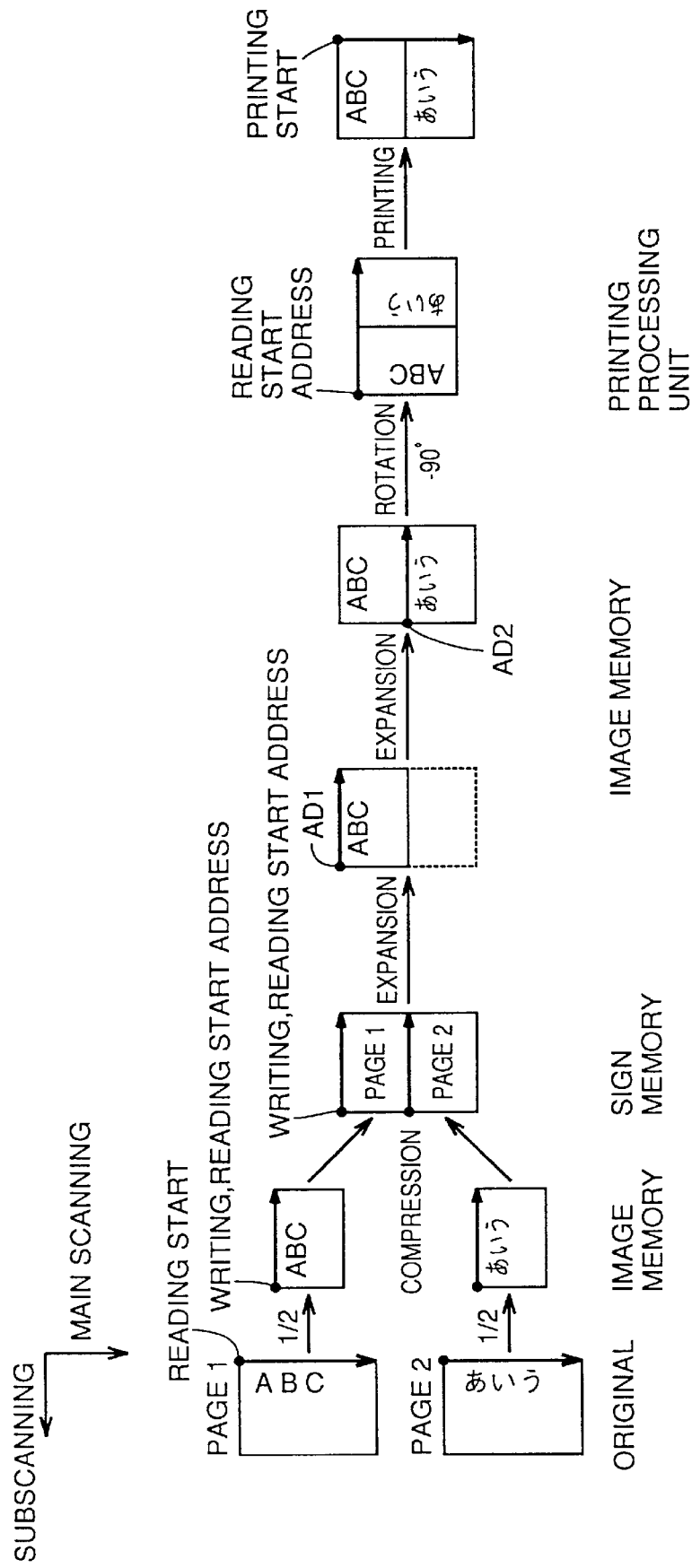
FIGS. 19 and 20 are diagrams explaining the image data processing of landscape horizontally written originals in the 2in1 mode.
Figure 20:
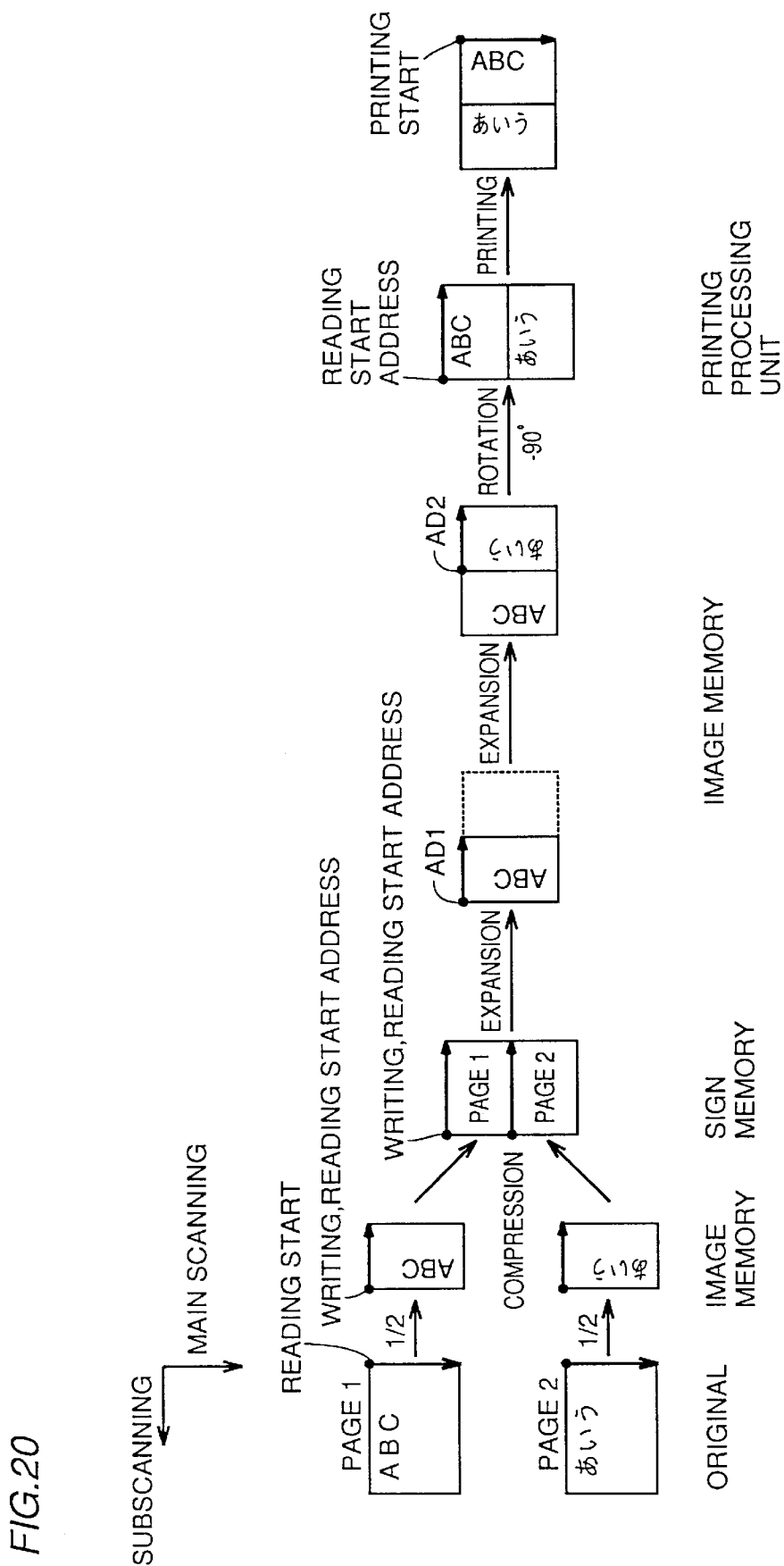

FIG. 17 shows the case where a portrait vertically written original is fed horizontally by ADF 500 in the 2in1 mode. FIG. 18 shows the case where the portrait vertically written original is fed vertically by ADF 500 in the 2in1 mode. FIG. 19 shows the case where a landscape horizontally written original is fed horizontally by ADF 500 in the 2in1 mode. The case where a landscape vertically written original is fed horizontally is similar to the case of FIG. 19. FIG. 20 shows the case where the landscape horizontally written original is fed vertically by ADF 500 in the 2in1 mode. The case where the landscape vertically written original is fed horizontally is similar to the case of FIG. 20.

Figure 21:
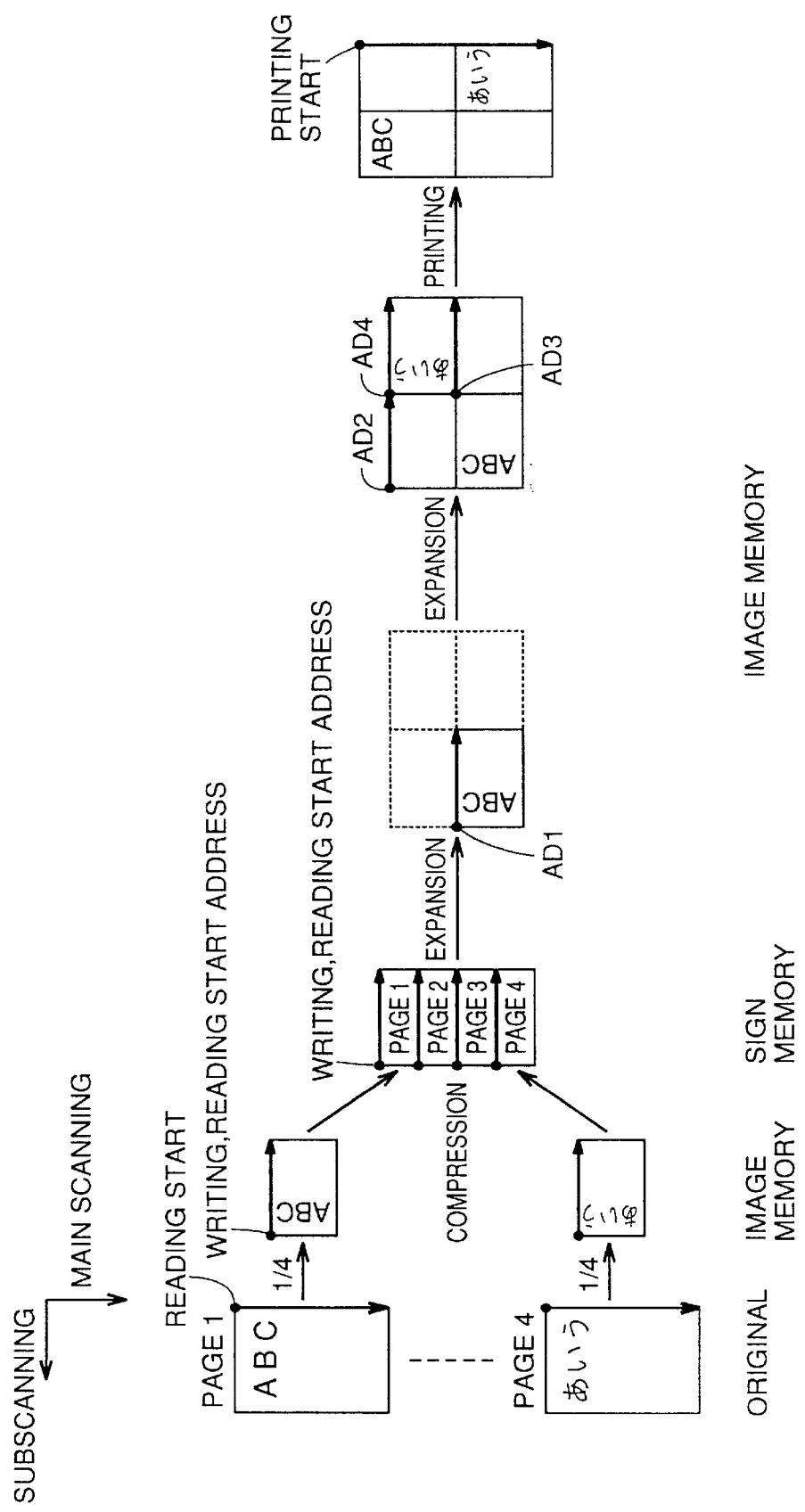
FIGS. 21 and 22 are diagrams explaining the image data processing of portrait horizontally written originals in the 4in1 mode.

FIG. 21 shows the case where the portrait horizontally written original is fed horizontally by ADF 500 in the 4in1 mode. In the 4in1 mode, the original image is reduced to ¼ to be read out by reading system 10. The read out image data is compressed to be written in sign memory 37 as pages 1 to 4. At this time, the image of the original fed onto platen glass 19 with top and bottom reversed is rotated by 180° in rotation processing portion 35 to be written in sign memory 37, as is described above.

Then the image data of page 1 is read out from address AD1. The image data of page 1 is expanded to be written in image memory 31. Then, image data of pages 2, 3, 4 are sequentially read out from addresses AD2, 3, 4 to be written in image memory 31. All printing data for one page is thus prepared. The printing data is transferred to printing processing unit 40 to be provided to optical system 60.

Figure 22:
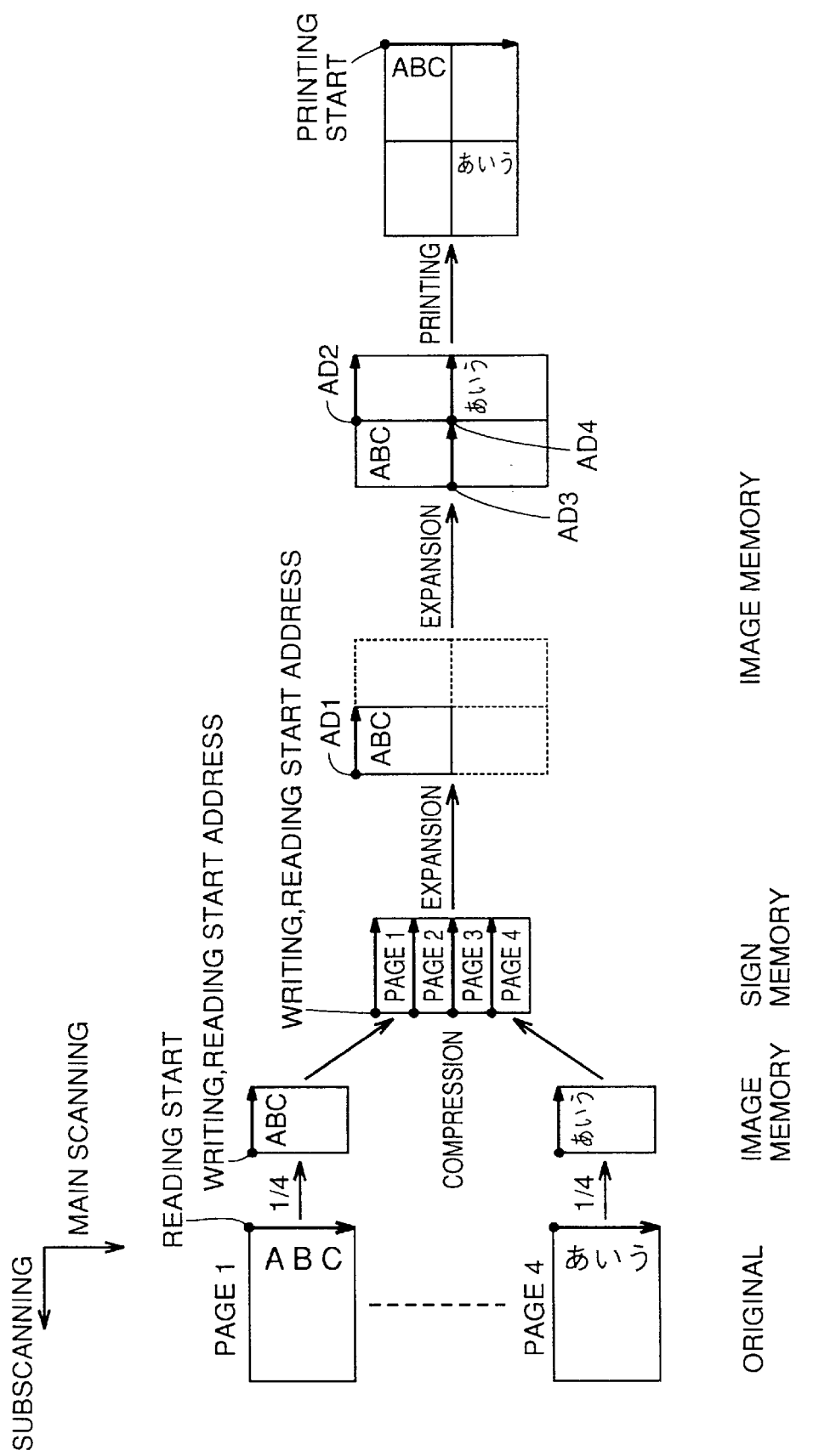
Figure 23:
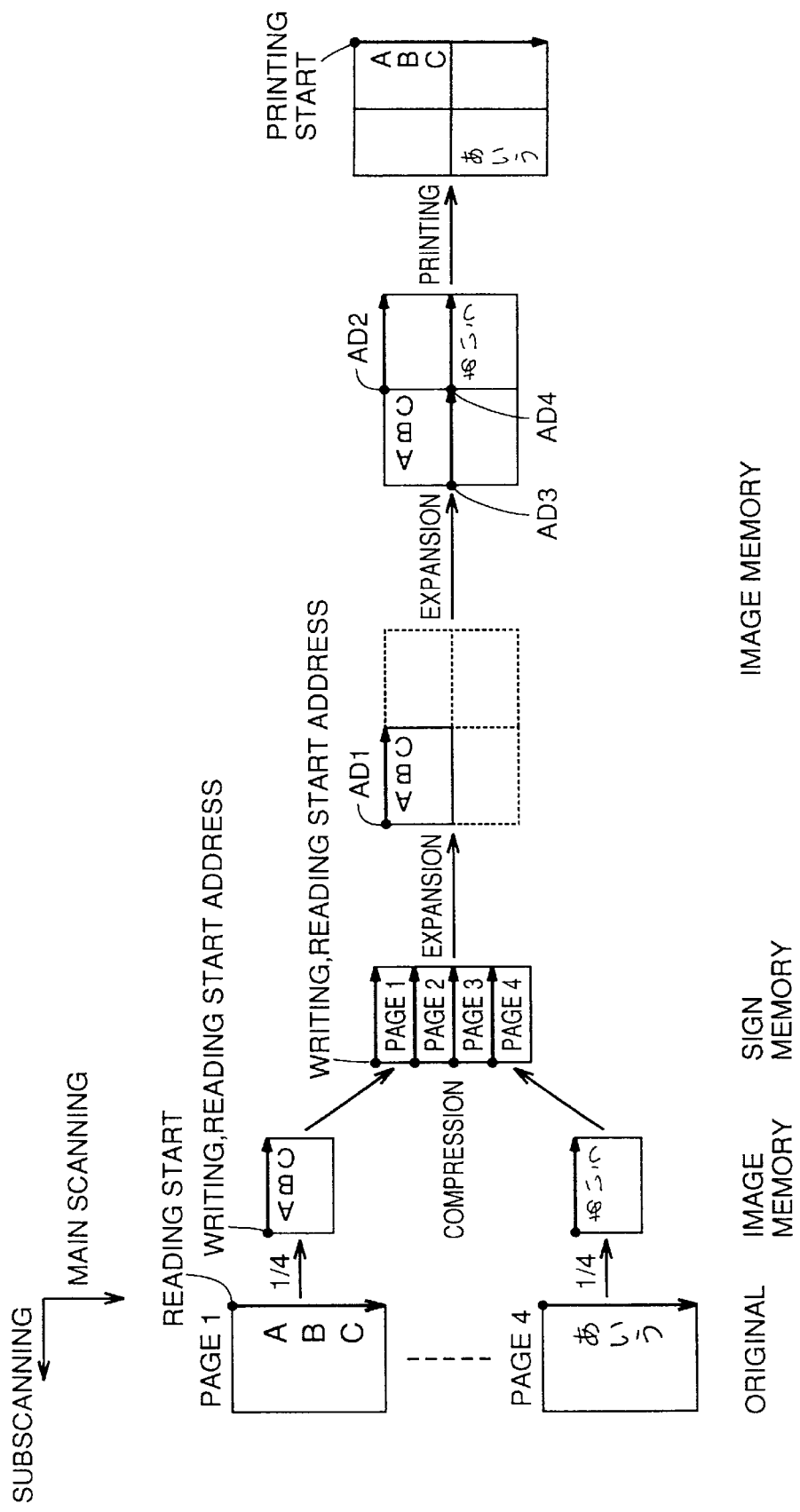
FIGS. 23 and 24 are diagrams explaining the image data processing of portrait vertically written originals in the 4in1 mode.
Figure 24:
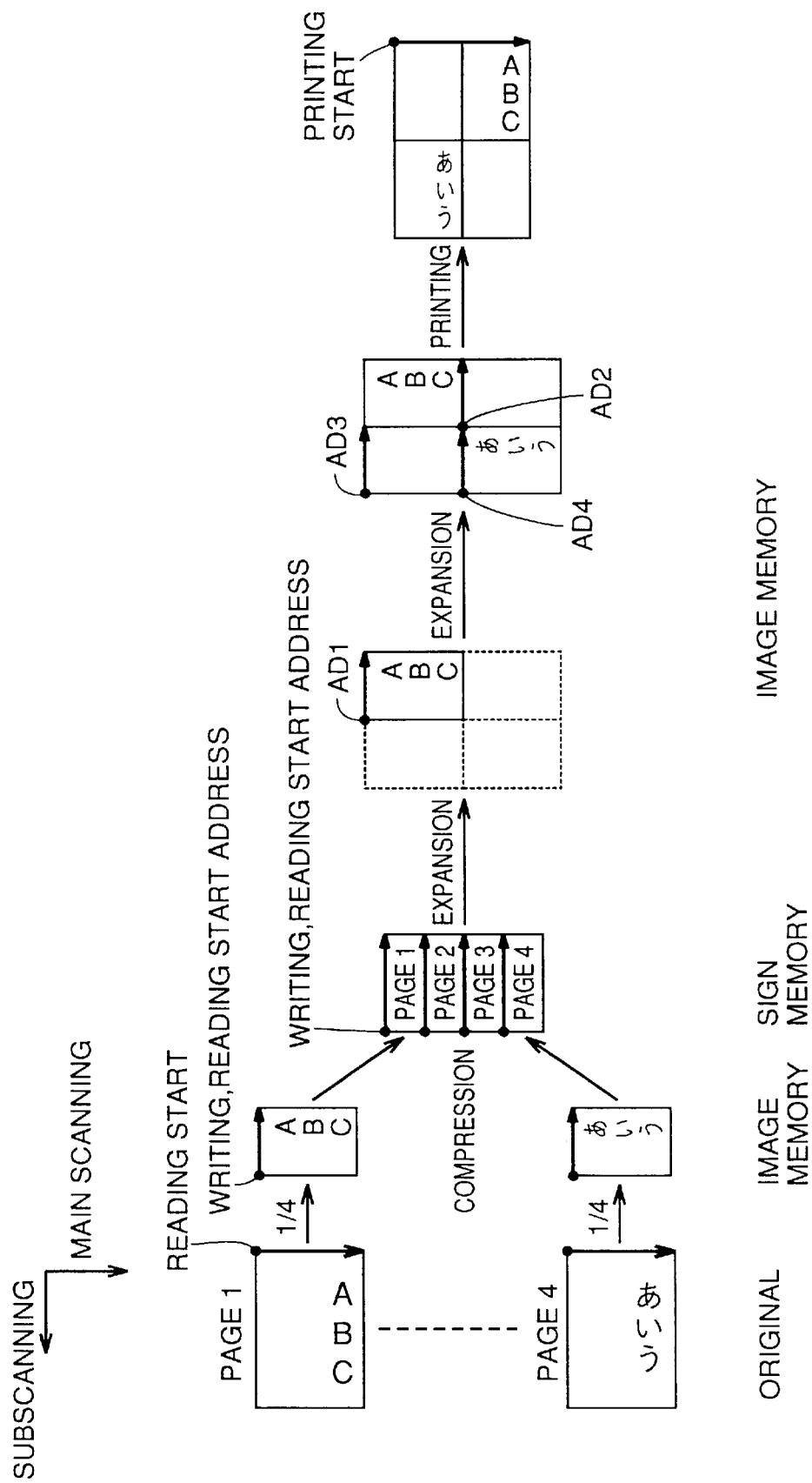

FIG. 22 shows the case where the portrait horizontally written original is fed vertically by ADF 500 in the 4in1 mode. FIG. 23 shows the case where the portrait vertically written original is fed horizontally by ADF 500 in the 4in1 mode. FIG. 24 shows the case where the portrait vertically written original is fed vertically by ADF 500 in the 4in1 mode.

Figure 25:
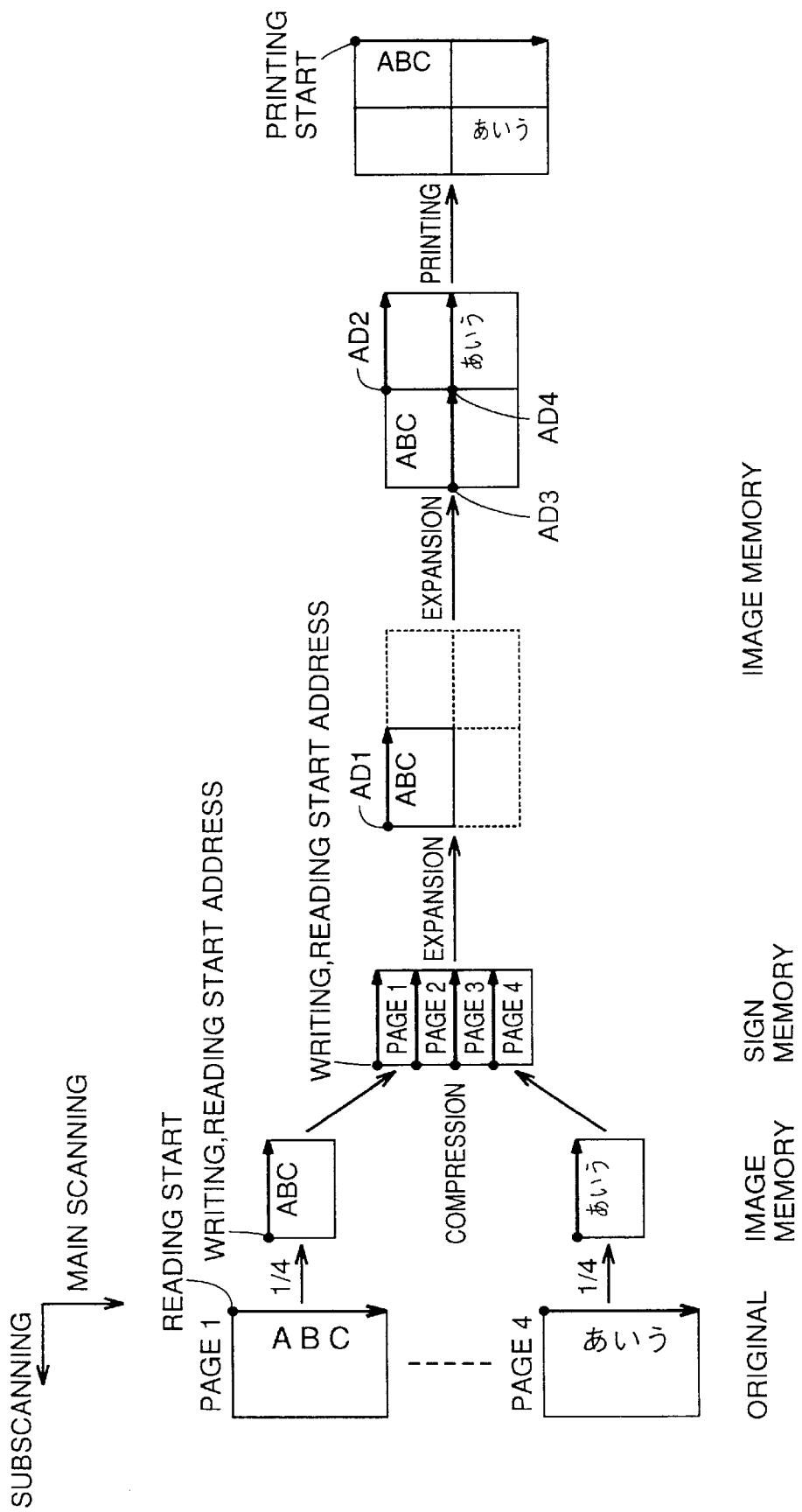
FIGS. 25 and 26 are diagrams explaining the image data processing of landscape horizontally written originals in the 4in1 mode.
Figure 26:
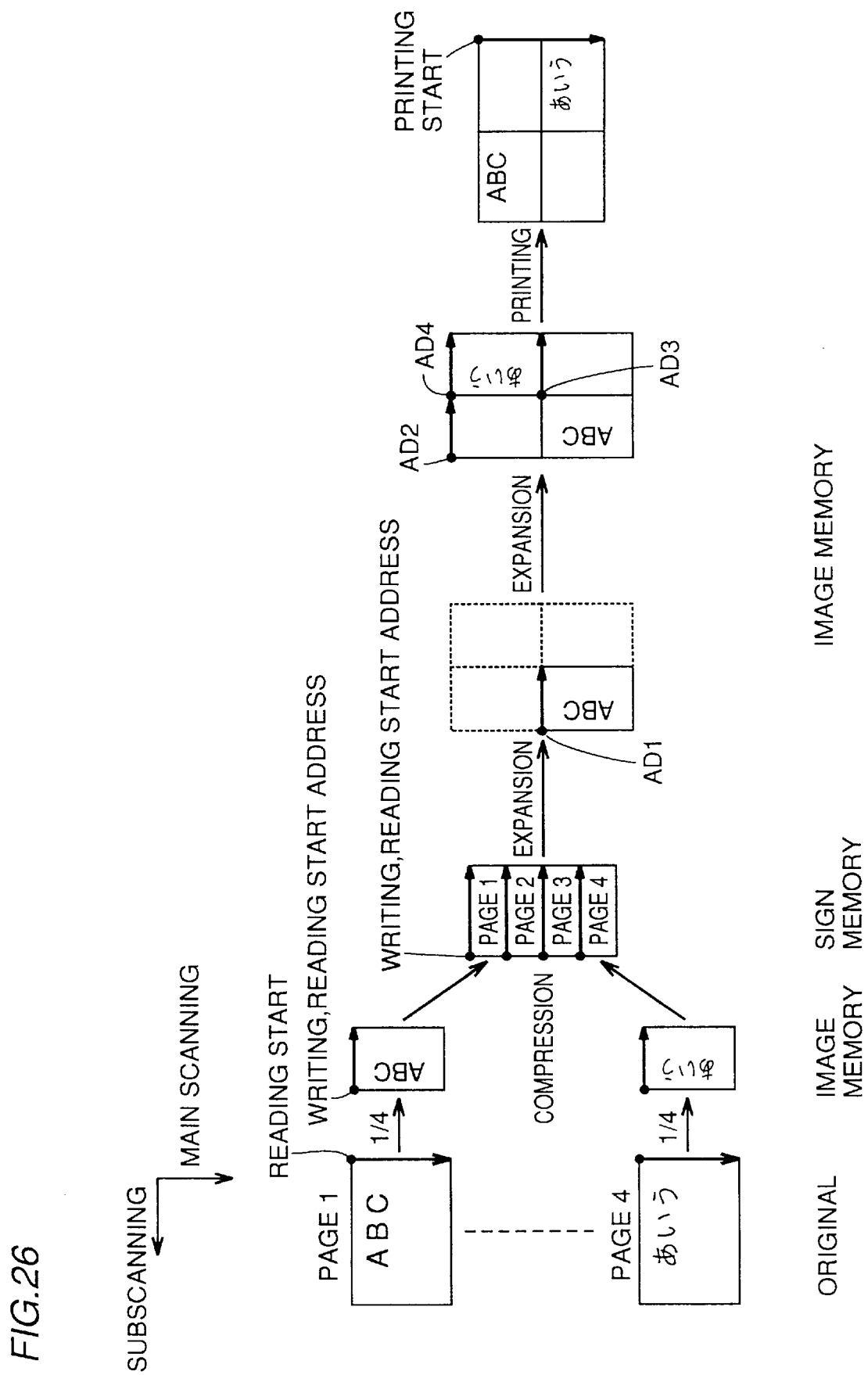
Figure 27:
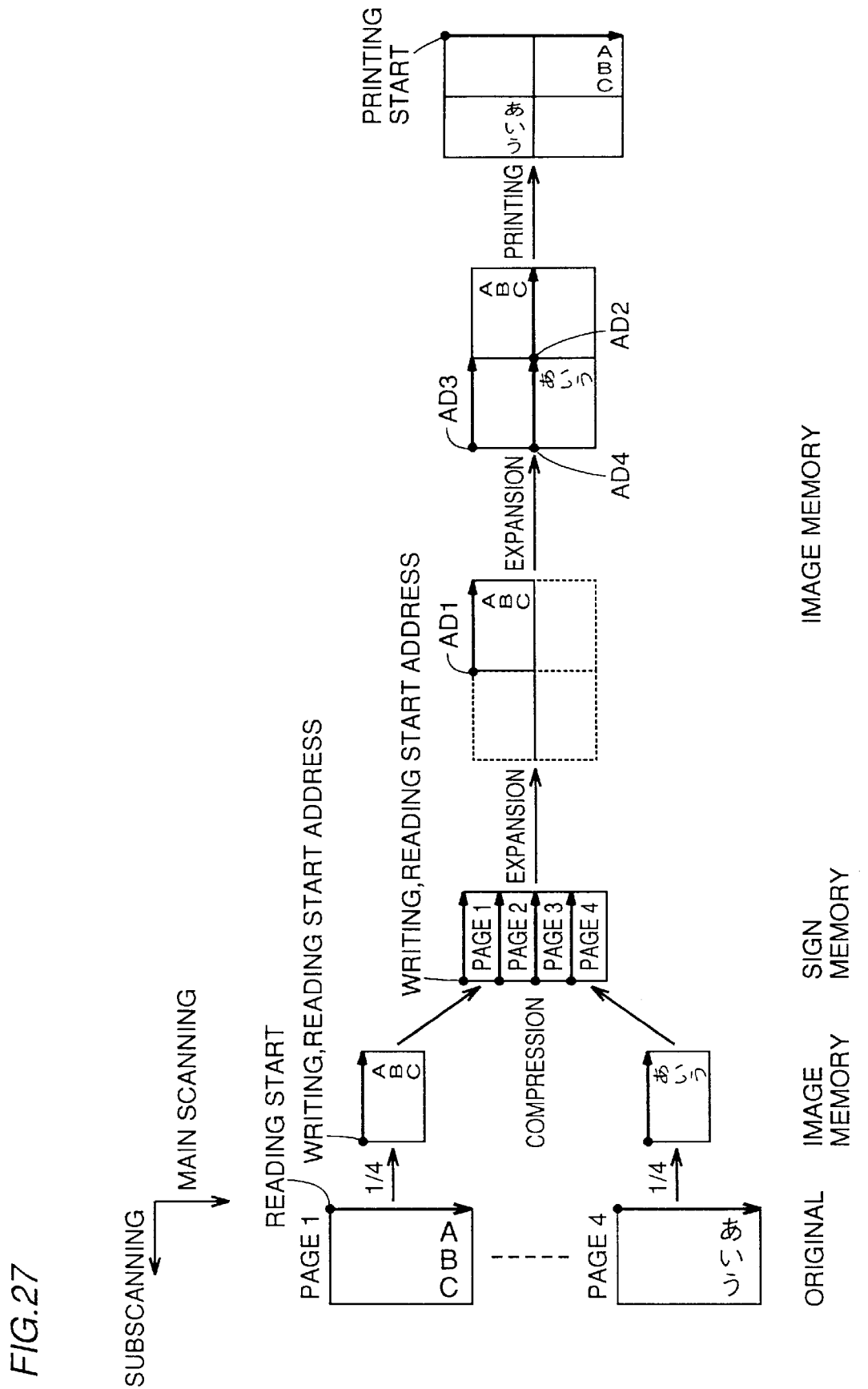
FIGS. 27 and 28 are diagrams explaining the image data processing of landscape vertically written originals in the 4in1 mode.
Figure 28:
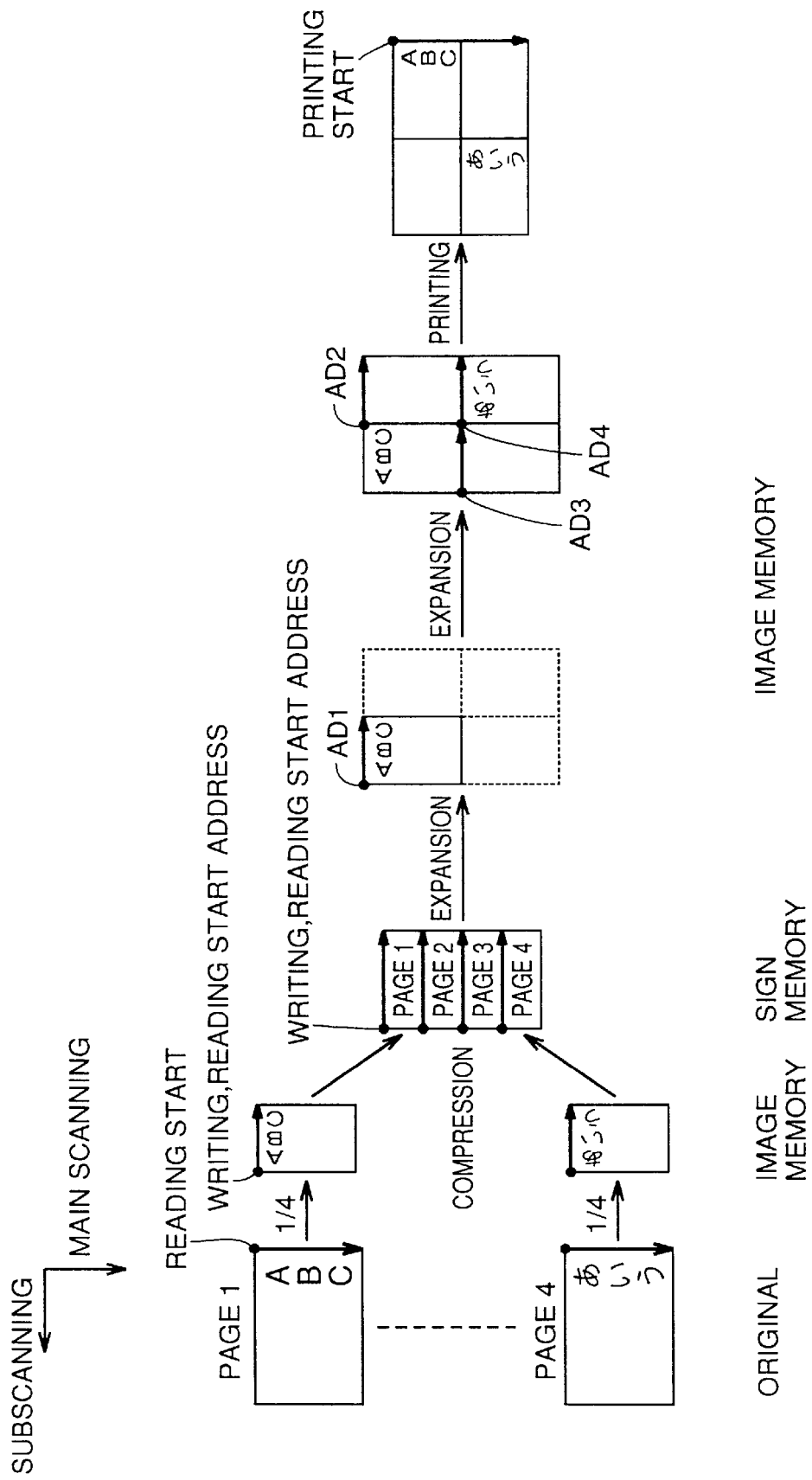

FIG. 25 shows the case where the landscape horizontally written original is fed horizontally by ADF 500 in the 4in1 mode. FIG. 26 shows the case where the landscape horizontally written original is fed vertically by ADF 500 in the 4in1 mode. FIG. 27 shows the case where the landscape vertically written original is fed horizontally by ADF 500 in the 4in1 mode. FIG. 28 shows the case where the landscape vertically written original is fed vertically in the 4in1 mode.

Description will now be given of the control procedure in the 4in1 mode as described above with reference to flow charts of FIGS. 29 to 34.

Figure 29:
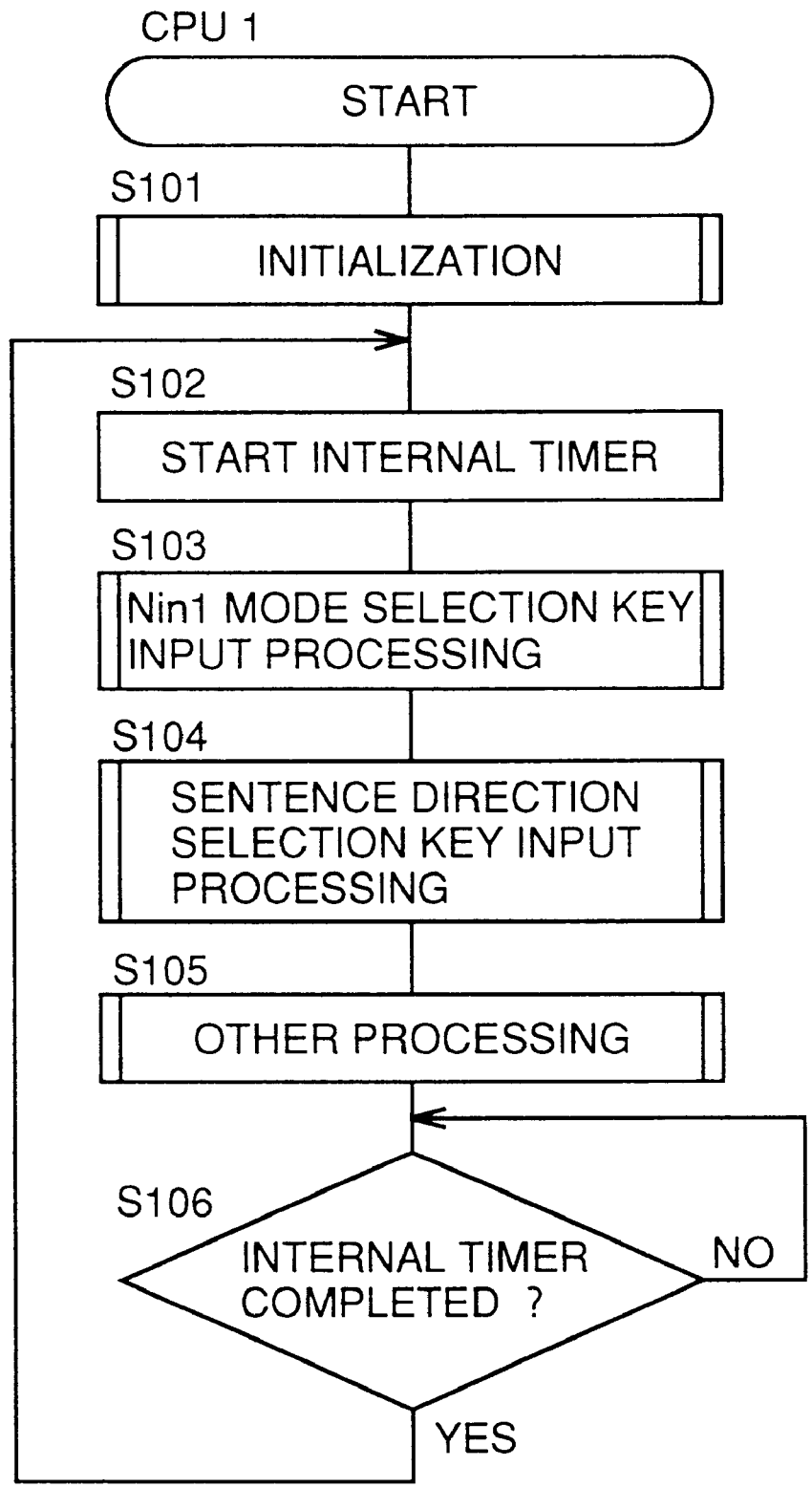
FIG. 29 is a flow chart showing a subroutine of the control procedure of CPU 1.

FIG. 29 shows the main routine of CPU 1 carrying out control relating to input and display of operation panel 90.

At step S101, RAM 111 is initialized, and at step S102, an internal timer is started. Then, at step 103, the input by Nin1 mode selection key 97 is processed, and at step S104, the input by sentence direction selection key 98 is processed. At step S105, other inputs and displays are processed. At step S106, after confirmation of completion of the internal timer, the procedure returns to step S102, and the above processing is repeated.

Figure 30:
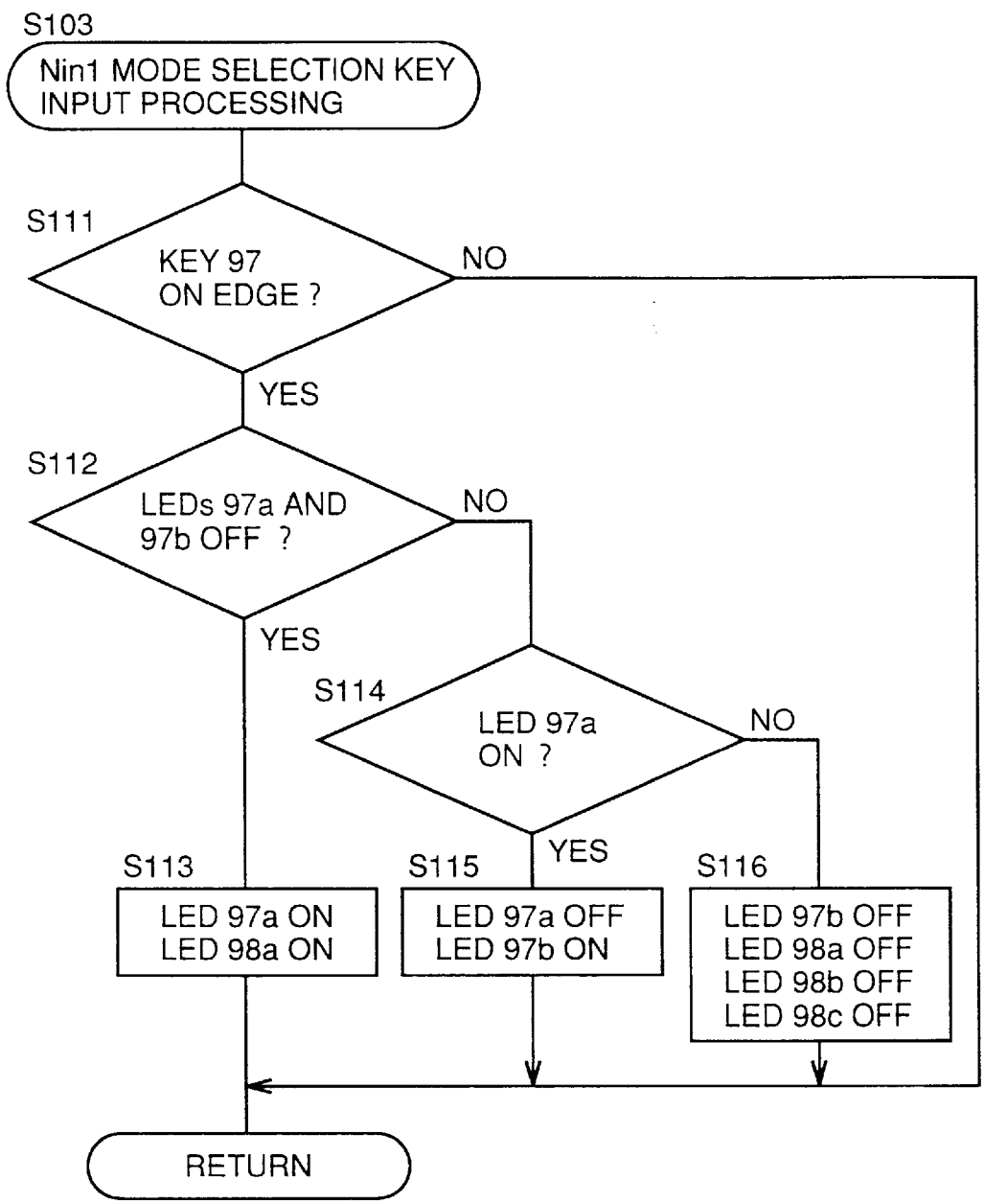
FIG. 30 is a flow chart showing a subroutine of the Nin1 mode selection key input processing in FIG. 29.

FIG. 30 shows the subroutine of the input processing carried out at step S103.

At step Slll, it is determined whether or not Nin1 mode selection key 97 is on edge. If it is not on edge, the subroutine is immediately completed. If it is on edge, at step S112, it is determined whether or not LEDs 97a, 97b are turned off. If both are turned off, at step S113, LED 97a is turned on and LED 98a is turned on. In other words, the 2in1 mode is selected and the sentence direction automatic recognition is selected. If any of LED 97a or 97b is turned on (NO at step S112), it is determined whether or not LED 97a is turned on at step S114. If LED 97a is turned on, at step S115, LED 97a is turned off and LED 97b is turned on. In other words, the 4in1 mode is selected. On the other hand, if NO is determined at step S114 (if LED 97b is turned on), at step S116, LEDs 97b, 98a, 98b and 98c are turned off. In other words, the Nin1 mode is released, and the sentence direction selection operation is simultaneously released because it is unnecessary.

Figure 31:
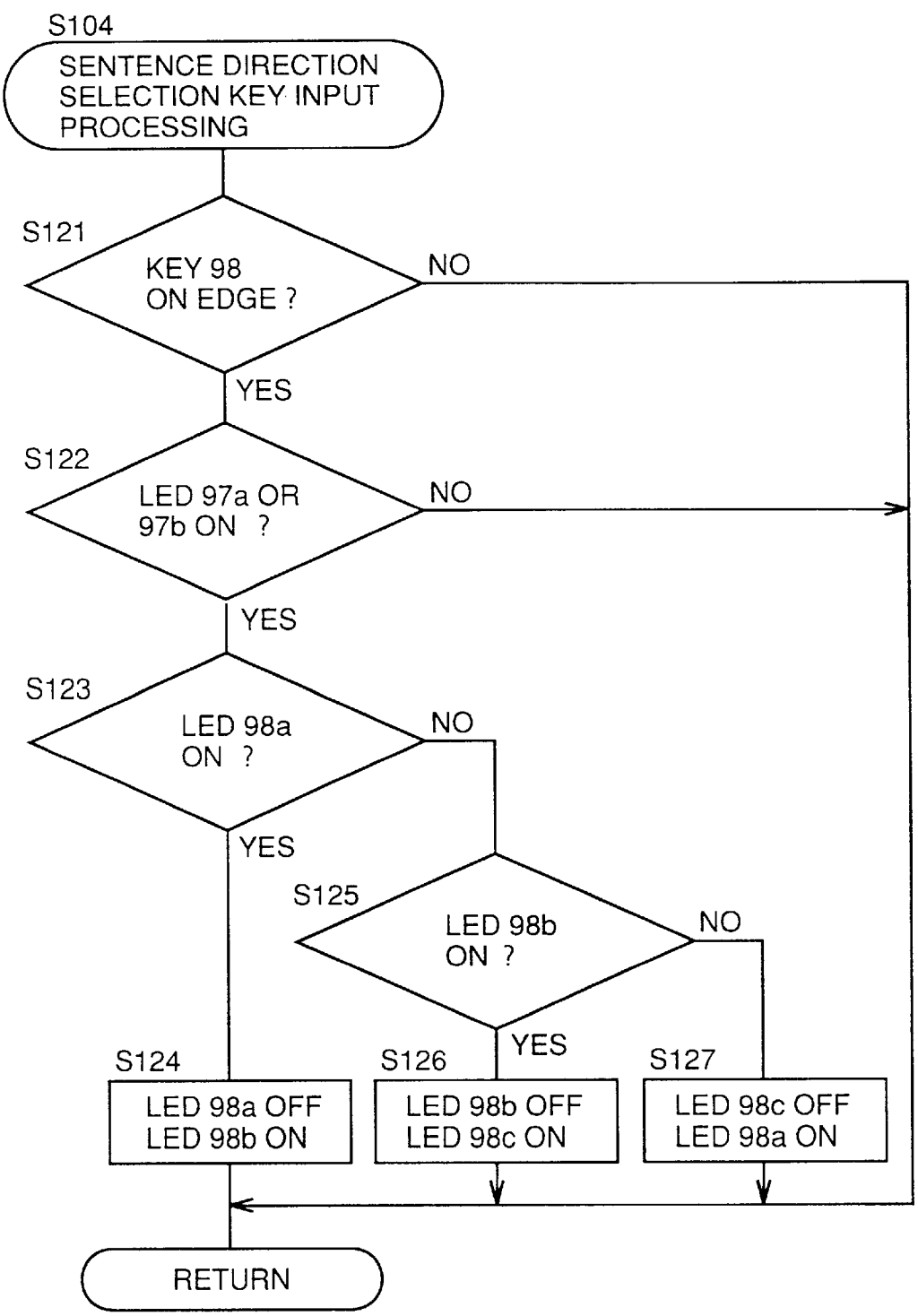
FIG. 31 is a flow chart showing a subroutine of the sentence direction selection key input processing in FIG. 29.

FIG. 31 shows the subroutine of the input processing carried out at step S104.

At step S121, it is determined whether or not sentence direction selection key 98 is on edge. If it is not on edge, the subroutine is immediately completed. If it is on edge, at step S122, it is determined whether any of LEd 97a or 97b is turned on. In other words, upon confirmation of selection of the Nin1 mode (YES at step S122), at step S123, it is determined whether LED 98a is turned on. If it is turned on, at step S124, LED 98a is turned off and LED 98b is turned on. As a result, the sentence direction of the original is selected to be horizontal. If NO at step S123, at step S125, it is determined whether LED 98b is turned on. If it is turned on, at step S126, LED 98b is turned off and LED 98c is turned on. As a result, the sentence direction of the original is selected to be vertical. If NO is determined at step S125, at step S127, LED 98c is turned off and LED 98a is turned on. As a result, the mode in which the sentence direction is automatically recognized is selected.

Figure 32:
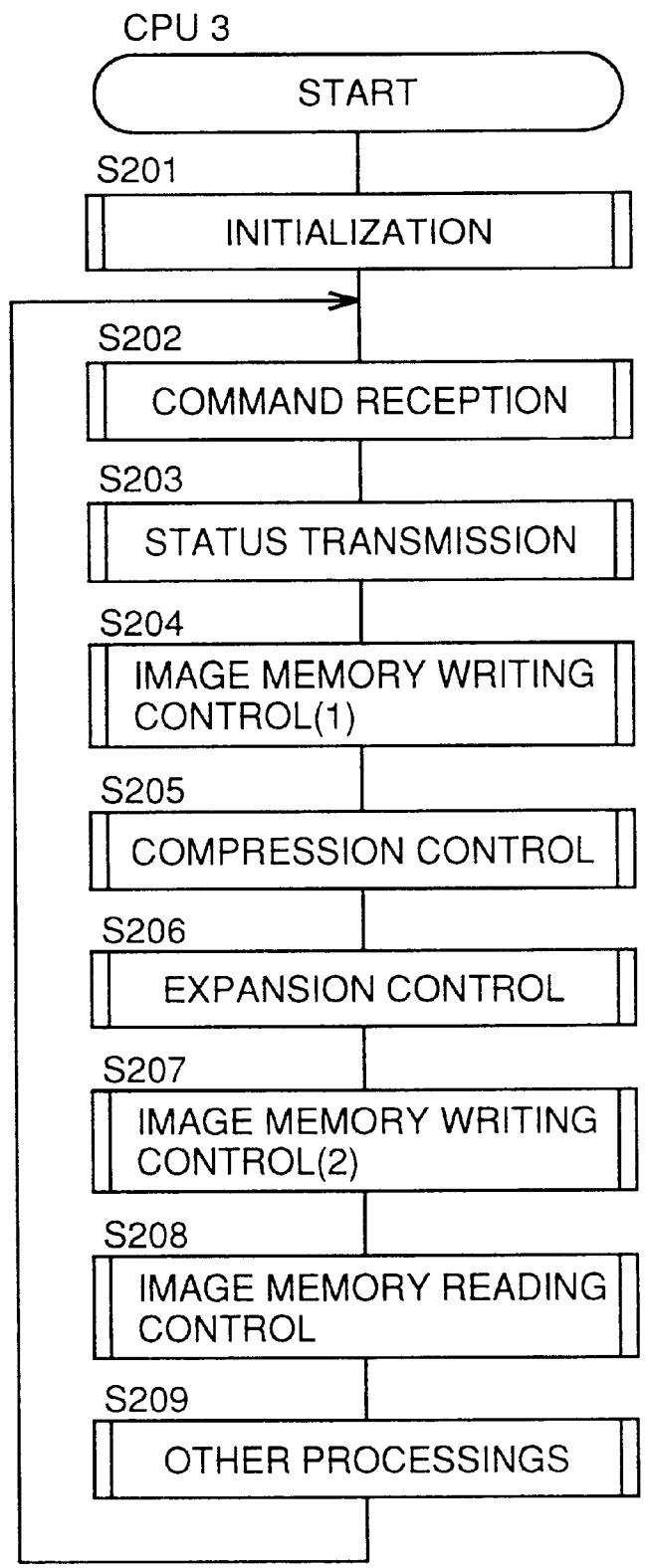
FIG. 32 is a flow chart showing a main routine of the control procedure of CPU 3.

FIG. 32 shows the main routine of CPU 3 carrying out control of memory unit 30.

Figure 33:
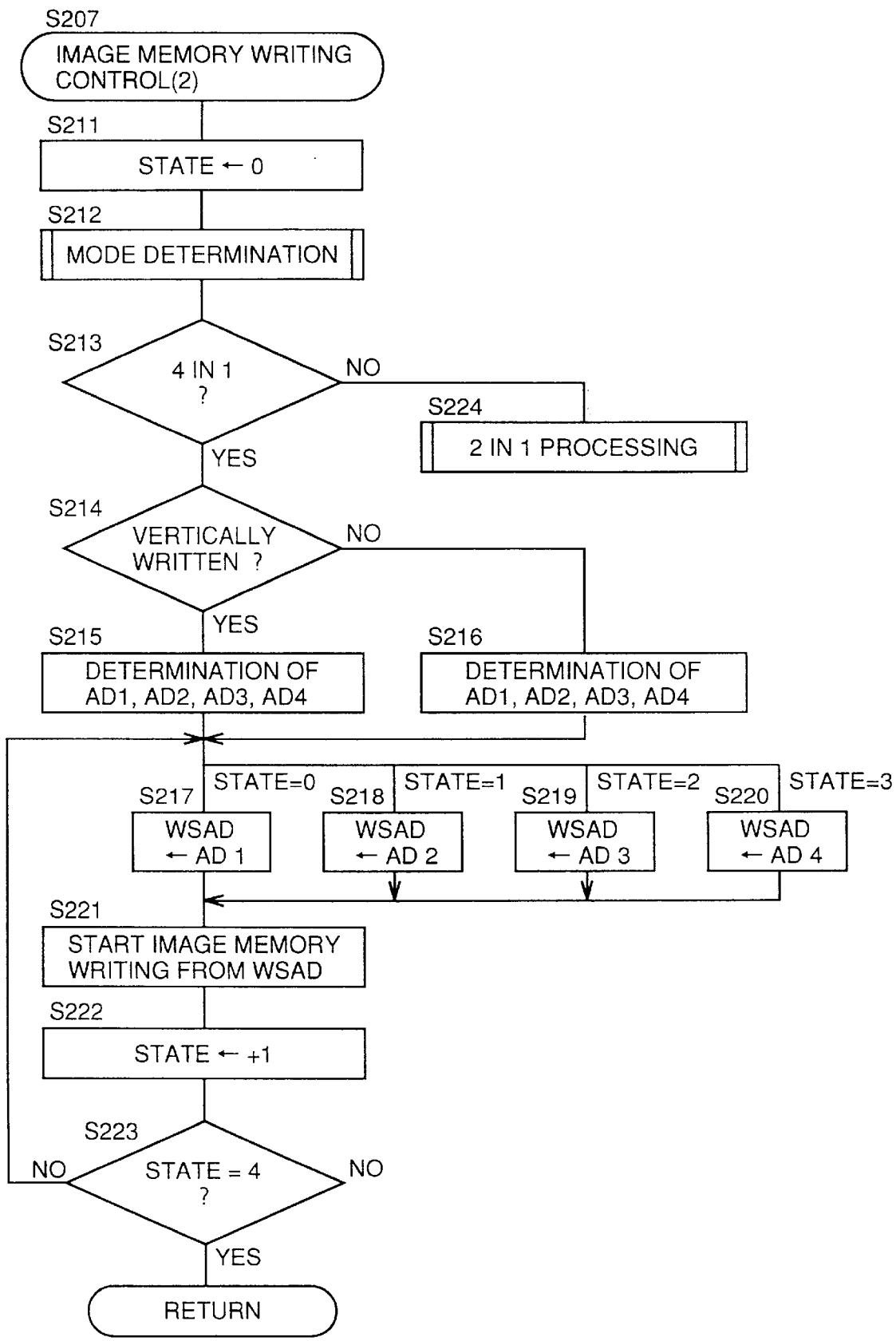
FIG. 33 is a flow chart showing a subroutine of the image memory writing control (2) in FIG. 32.

At step S201, the RAM is initialized. At steps S202, S203, reception and transmission of commands and statuses to and from other CPUs are processed. Then, at step S204, the image data transferred from image data processing unit 20 is written in image memory 31. At step S205, the image data is compressed, and at step S206, the image data is expanded. Then, at step S207, the image data for N pieces of paper is written in image memory 31 to generate printing data for one page (the control procedure of which is shown in FIG. 33). At step S208, the printing data is read out from image memory 31 to be transferred to printing processing unit 40. At step S209, other processings are carried out, and one routine is completed. The procedure returns to step S202.

FIG. 33 shows the subroutine of the image memory writing control (2) carried out at step S207.

In this subroutine, at step S211, the count value of the state is reset to "0", and the mode (the Nin1 mode and the sentence direction) currently selected is determined at step S212. At steps S213, S214, control according to the kind of the mode is selected.

If the 4in1 mode is selected (YES at step S213), at step S214, it is determined whether sentences are written vertically or horizontally. Writing start addresses AD1, AD2, AD3, AD4 of each page for image memory 31 are determined at step S215 if sentences are vertically written and at step S216 if horizontally written. These addresses are predetermined for each page according to the kind of the original (portrait or landscape, horizontal feeding or vertical feeding, the sentence direction), as shown in FIGS. 21 to 28.

At steps S217 to S220, according to the count value of the state, an address WSAD at which writing in image memory 31 is actually started is set to any of AD1 to AD4. Then, at step S221, the image data is written in image memory 31 from the address WSAD. At step S222, "1" is added to the count value of the state, and at step S223, it is determined whether the count value of the state is "4". If the count value is less than "4", steps S217 to S222 are repeated. If the value takes "4", the subroutine is completed. More specifically, since the state is initially reset to "0", the processing at step S217 is first carried out, and writing is started from the address AD1. Then, at step S222, the count value of the state is set to "1", the processing at step S218 is carried out, and writing is started from the address AD2. Similarly, the count value of the state is incremented, and writing from addresses AD3, AD4 is carried out.

Figure 34:
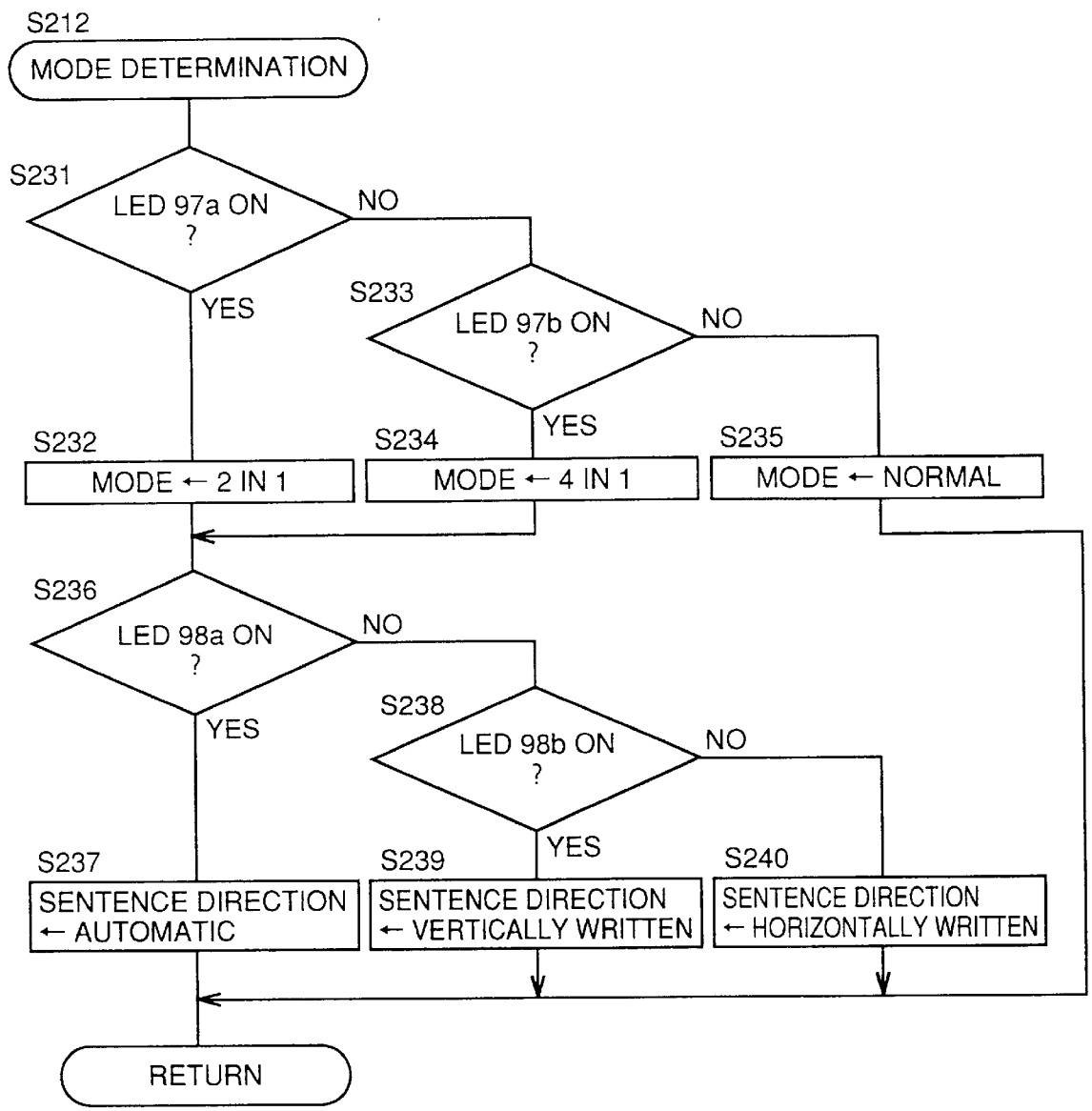
FIG. 34 is a flow chart showing a subroutine of the mode determination in FIG. 33.

FIG. 34 shows the subroutine of mode determination carried out at step S212.

At steps S231, S233, it is determined whether LEDs 97a, 97b are turned on. If LED 97a is turned on, it is determined that the 2in1 mode is selected at step S232. If LED 97b is turned on, it is determined that the 4in1 mode is selected at step S234. If LEDs 97a, 97b are turned off, it is determined that the ordinary mode is selected at step S235. If the ordinary mode is selected, the subroutine is completed.

If the 2in1 mode or the 4in1 mode is selected, it is determined whether LEDs 98a, 98b are turned on at steps S236, S238. If LED 98a is turned on, it is determined that the sentence direction is recognized in the automatic recognition mode at step S237. If LED 98b is turned on, it is determined that sentences are written vertically at step S239 (it is confirmed by the operator that sentences are vertically written). If LEDs 98a, 98b are turned off, in other words, if LED 98c is turned on, it is determined that sentences are horizontally written (it is confirmed by the operator that sentences are horizontally written) at step S240.

As is clear from the above description, in this embodiment, in the Nin1 mode (the 2in1 mode and the 4in1 mode), it is possible to automatically recognize top and bottom directions of original images and directions in which sentences run included in the original images. Based on the recognition result, arrangement of images is determined so that plural (two or four) original images are printed on one papersheet with the images headed in one direction.

(2) The Second Embodiment

Description will now be given of the second embodiment of the present invention. The structure of the digital copying apparatus in the second embodiment is the same as that of the first embodiment.

In the first embodiment described above, when it is recognized that the image direction is opposite, the read out image data is rotated by 180° in rotation processing portion 35. Then the image data is written in the sign memory. However, in the second embodiment, when all the originals set in the reading portion are opposite in direction, the image data is not rotated, but arrangement of each page is changed. As a result, it is possible to compose a plurality of images as printing data for one page without changing the order of pages.

In the second embodiment, it is assumed that a longitudinal A4 papersheet (longitudinal length 297 mm, lateral length 210 mm) is set at a selected paper feed cassette in response to a signal transmitted from CPU 4. It is further assumed that, according to the original size detection result stored in the management table MT, lateral A4 papersheets of the same size (longitudinal length 210 mm, lateral length 297 mm) are detected for a series of the 2in1 copying mode. It is also assumed that two originals are placed in the direction of a portrait as a reference set.

FIG. 35A is a flow chart showing the processing in this case. At first, CPU 6 ensures a vacant space for two pages of a lateral A4 papersheet, that is, a memory capacity for a longitudinal A3 papersheet, in image memory 31 (step S311). Then, information on top and bottom directions of the originals is read out from the original management table MT (S313). Referring to FIG. 7, the image is a normal image. When it is determined that the image is a normal image at S315, the image reading position of the first page is set to the reference address (0, 0) of image memory 31, and the reference address of the second page is set to (XX, 0). The reference address XX is a value determined by the image size (for example, A4), at which overlapping with the other page on the same size is avoided. FIG. 35B shows the specific positional relation. The sign data for the first page of the lateral A4 papersheet stored in sign memory 37 is developed in image memory 31 through expanding portion 38 (S321).

As a second step, the image reading position of the second page is set to a position (210, 0), which is on the right of the first page and does not overlap the first page already developed (S323). Then, the second page is developed in image memory 31. As a result, a 2in1 image of the first page and the second page for a longitudinal A3 papersheet is obtained on image memory 31.

As a third step, the image is transferred to the printing portion to obtain a 2in1 copy. Since information on the output pap er size being A4T (T denotes the longitudinal direction) has been sent from CPU 4, CPU 3 sets a magnification ratio of X0.707, which is a variable-scale magnification ratio of A3T→A4T (S325). After variable-scale magnification, the image is outputted to the printing portion (S327).

According to the above-described operation, the 2in1 copy is obtained on an A4T papersheet with the first page and the second page copied left and right, respectively, at a magnification ratio of X0.707. By similarly processing the third and succeeding pages, a series of 2in1 copying is carried out.

Figure 36:
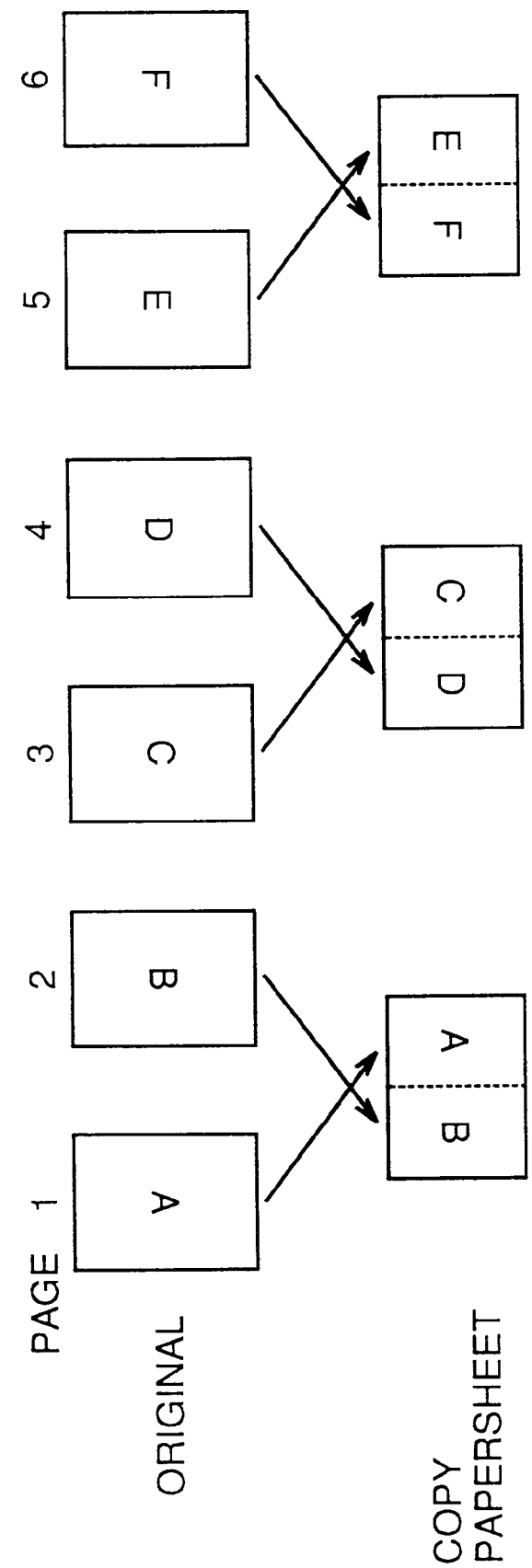
FIG. 36 is a diagram for explaining the effect of the copying apparatus according to the second embodiment of the present invention.

Description will now be given of the case where the original set direction is opposite to the reference set direction. This state is shown in FIG. 36.

As a first step, similar to the above-described example, after ensuring a memory for a longitudinal A3 papersheet, information on top and bottom directions of originals is read out from the management table MT. In this case, since the image is a reverse image (S315), the image reading position of the first page is set to (XX, 0), more specifically, to (210, 0), which is the position of the second page in the above example (S319). Then, the image of the first page is developed in memory 31.

As a second step, since the image i s reversed, the image reading position of the second page is set to (0, 0), which is the position of the first page of the above example. The image of the second page is developed in memory 31. At this time, similar to the above-described case, the first page and the second page do not overlap, and the second page is positioned on the left side of the first page.

The third and succeeding steps are the same as those of the above example. According to the above operation, the 2in1 copy is obtained on an A4T papersheet at a magnification ratio of X0.707 with the first page and the second page placed right and left, respectively. As for the third and succeeding pages, a series of 2in1 copying is carried out similarly. As a result, as shown in FIG. 36, even if the original set direction is opposite, a copying result in which images are arranged in the order of pages is obtained irrespective of the original set direction.

The image forming apparatus according to the present invention is not limited to the above-described embodiments. The image forming apparatus of the present invention can be modified variously in the scope of the gist of the present invention.

For example, structures of optical system 60, image forming system 70 and sheet feeding system 80 are arbitrary. In particular, an image may be formed on a photoreceptor using a light shutter element using liquid crystal or PLZT $((Pb_{1-x}La_x)(Zr_yTi_{1-y})_{1-x/4}O_3)$ as an image printing head, other than the laser beam scanning optical system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus for forming a plurality of images on one side of a paper sheet, comprising:

storing means for storing image data corresponding to the plurality of images input to said image apparatus, and for storing each image with a page order;

detecting means for detecting directions of said images based on said image data stored by said storing means;

image forming means for forming said image data stored in said storing means as a plurality of respective images on said on side of said paper sheet; and processing means responsive to the page order of said stored images, and responsive to a detection result of said detecting means for processing said image data stored by said storing means so that said image forming means forms said plurality of images on said one paper sheet in a prescribed arrangement that is determined independent of the directions of the plurality of respective images stored by said storing means.

2. The image forming apparatus as recited in claim 1, further comprising:

reading means for reading an original image to produce the image data for being stored by said storing means.

3. The image forming apparatus as recited in claim 1, further comprising:

receiving means for receiving said image data for being stored in said storing means.

4. The image forming apparatus as recited in claim 1, wherein said storing means includes a first storing portion and a second storing portion, said detecting means detects the direction of an image based on image data stored in said first storing portion, and said processing means rearranges the image data stored in said first storing portion in a prescribed location of said second storing portion based on a detection result of said detecting means.

5. The image forming apparatus as recited in claim 4, further comprising:
    variable-scale magnifying means for variable-scale magnifying said image data stored in said storing means so that said plurality of images are formed on one papersheet.

6. The image forming apparatus as recited in claim 4, further comprising:
    rotating means for rotating the direction of the image of said image data stored in said storing means to a prescribed direction.

7. The image forming apparatus as recited in claim 4, wherein
    said detecting means determines a direction of a character in said image to detect a top and a bottom direction of said image.

8. The image forming apparatus as recited in claim 7, wherein
    said detecting means determines the direction of the character based on a comparison result of the character in said image with a prescribed pattern.

9. The image forming apparatus as recited in claim 4, wherein said detecting means determines a distribution of pixels of a prescribed color in prescribed lines in a vertical direction and a lateral direction of a character.

10. An apparatus for reading out and copying a plurality of originals onto one paper sheet, comprising:
    a sheet feeder for feeding originals in at least one of a longitudinal or widthwise orientation to said apparatus:
    reading means for reading the originals to produce corresponding image data;
    determining means for determining top and bottom directions of all the originals read by said reading means;
    image forming means for forming a plurality of pages of images in a prescribed arrangement order based on said image data produced by said reading means;
    control means for controlling said image forming means so that, when top and bottom directions of any of the originals are determined to be opposite by said determining means, said plurality of pages of images are formed on said one paper sheet in an arrangement order opposite to th prescribed arrangement order;
    a copy sheet holder for supplying copy sheets to said apparatus for printing said images thereon, said copy sheet holder supplying said copy sheets in at least one of a longitudinal or widthwise orientation; and
    an image rotator for rotating said images prior to printing when a sheet orientation of an original fed by said sheet feeder is different from a copy sheet orientation fed by said copy sheet holder.

11. The apparatus as recited in claim 10, further comprising:
    storing means for storing said image data produced by said reading means to supply said image data to said image forming means.

12. The apparatus as recited in claim 11, wherein
    said determining means extracts an image data of a character region from said image data of said originals, and determines a direction of a character from said extracted image data to determine top and bottom directions of said originals.

13. An apparatus for reading a plurality of originals to copy the same onto one side of a paper sheet, comprising:
    reading means for reading the originals to produce corresponding image data;
    determining means for detecting an arrangement direction of a character in each said original read by said reading means;
    image forming means responsive to the arrangement direction of the character determined by said determining means for forming a plurality of images in a prescribed arrangement order on the one side of the paper sheet based on said image data produced by said reading means; and
    means responsive to an orientation of said originals for processing said image data to rotate one or more of said images so that said images are printed on a copy sheet in an orientation corresponding to an orientation of said images on the respective said signals.

14. The apparatus as recited in claim 13, wherein
    said determining means determines top and bottom directions of said originals, and said image forming means forms said plurality of images on said one papersheet in a prescribed arrangement order according to top and bottom directions of said originals and the arrangement direction of the characters.

15. An image forming apparatus for receiving at least a first image and a second image on first and second documents to form said first and second images on one side of a paper sheet, the documents having the images in either landscape or portrait style, with images looking upwardly or downwardly, and entered in the apparatus either horizontally or vertically, comprising:
    storing means for storing image data corresponding to the first and second images input to said apparatus, and for storing each image with a page order relating to the order the documents entered the apparatus;
    a sentence direction recognizing portion to determine the direction of text in the images;
    an original direction recognizing portion to recognize the orientation of text in the images, and
    an imaging forming portion for forming said image data stored in said storing means as a plurality of respective images on the one side of said paper sheet; and
    a processor responsive to the page order of the documents entering the apparatus and responsive to the sentence direction and original direction recognized by said sentence direction recognizing portion and said original direction recognizing portion to reposition the images as required for forming the images on the said one side of said paper sheet to maintain the order of the documents as they were received in the apparatus independent of the directions of the plurality of respective images stored by said storing means.

16. The apparatus of claim 15 wherein the processor reverses the order of the images from the order the documents were received in the apparatus if both images are determined by the original direction recognizing portion to be looking downwardly.

17. The apparatus of claim 15 for reading first, second, third and fourth documents entered into the apparatus in that order, the processor further reorienting all four images for forming on said one side of the paper sheet by said image forming portion in the order the documents were entered into the apparatus.

* * * * *

UNITED STATES PATENT AND TRADEMARK OFFICE
CERTIFICATE OF CORRECTION

PATENT NO.     : 6,144,777
DATED          : November 7, 2000
INVENTOR(S)    : Kaoru Tada, Hiroya Sugawa, Atsushi Ishikawa, Akio Nakajima, and Hideo Kumashiro It is certified that error appears in the above-identified patent and that said Letters Patent is hereby corrected as shown below:

Column 14,
Line 7, (claim 13, line 5), delete "detecting", and insert -- determining --.
Line 20 (claim 13, line 18), delete "signals", and insert -- originals --.

Signed and Sealed this

Twenty-third Day of October, 2001

*Attest:*

*Attesting Officer*

NICHOLAS P. GODICI
*Acting Director of the United States Patent and Trademark Office*